United States Patent [19]

Monastra et al.

[11] Patent Number: 5,038,311
[45] Date of Patent: Aug. 6, 1991

[54] PIPELINED FAST FOURIER TRANSFORM PROCESSOR

[75] Inventors: Edward J. Monastra, Voorhees; Jim J. Huah, Cherry Hill, both of N.J.

[73] Assignee: General Electric Company, Morrestown, N.J.

[21] Appl. No.: 565,079

[22] Filed: Aug. 10, 1990

[51] Int. Cl.⁵ .............................................. G06F 15/332
[52] U.S. Cl. .................................................... 364/726
[58] Field of Search ................................. 364/725, 726

[56] References Cited

U.S. PATENT DOCUMENTS

| | | | |
|---|---|---|---|
| 3,816,729 | 6/1974 | Works | 364/726 |
| 4,275,452 | 6/1981 | White | 364/726 |
| 4,899,301 | 2/1990 | Nishitani et al. | 364/726 |
| 4,970,674 | 11/1990 | White | 364/726 |

OTHER PUBLICATIONS

"A guided tour of the fast Fourier transform" by Bergland, published at pp. 41-51 of the IEEE Spectrum, Jul. 1969.

"A Pipeline Fast Fourier Transform", By Groginsky et al., published at pp. 22-29 of Eascon '69 Record, 1969.

"Implementation of a Pipeline FET" by Sheats et al., published at pp. 156-157 of Nerem '70 record, 1970.

A paper entitled "FAST FOURIER TRANSFORM" pp. 149-154 by Sheats as Chapter 9, *Radar Technology*, Eli Brockner, Artech House Massachusetts 1977.

Primary Examiner—Gary V. Harkcom
Assistant Examiner—Long T. Nguyen
Attorney, Agent, or Firm—William H. Meise

[57] ABSTRACT

A pipeline Fast Fourier Transform arrangement includes a cascade of four Butterfly Arithmetic Units (BAU). Weighting and control signals are coupled to each BAU in the cascade. A multiplexed memory arrangement operated in a "ping-pong" manner stores four-stage partial FFT signal as it is generated, and returns it to the first BAU in the cascade for subsequent passes to generate multiple-stage FFT signals. Each BAU includes local memories cyclically fed and addressed to generate temporal offsets, which differ among the processors of the cascade.

5 Claims, 23 Drawing Sheets

REAL BAU STAGE I

| I CLOCK PULSE | II WAP F1 MEMORY 218 | III WAP F2 MEMORY 220 | IV LEFT SUMMER 210 | V RIGHT SUMMER 212 |
|---|---|---|---|---|
| 1 | 0 | WAP F1 + 1 | ADD | SUB |
| 2 | 1 | WAP F1 – 1 | SUB | ADD |
| 3 | 2 | WAP F1 + 1 | ADD | SUB |
| 4 | 3 | WAP F1 – 1 | SUB | ADD |
| ⋮ | ⋮ | ⋮ | ⋮ | ⋮ |
| 14 | 13 | WAP F1 – 1 | SUB | ADD |
| 15 | 14 | WAP F1 + 1 | ADD | SUB |
| 16 | 15 | WAP F1 – 1 | SUB | ADD |

*FIG. 3a*

IMAGINARY BAU STAGE I

| I CLOCK PULSE | II WAP F1 MEMORY 222 | III WAP F2 MEMORY 224 | IV LEFT SUMMER 214 | V RIGHT SUMMER 216 |
|---|---|---|---|---|
| 1 | WAP F2 + 1 | 0 | SUB | ADD |
| 2 | WAP F2 – 1 | 1 | ADD | SUB |
| 3 | WAP F2 + 1 | 2 | SUB | ADD |
| 4 | WAP F2 – 1 | 3 | ADD | SUB |
| ⋮ | ⋮ | ⋮ | ⋮ | ⋮ |
| 14 | WAP F2 – 1 | 13 | ADD | SUB |
| 15 | WAP F2 + 1 | 14 | SUB | ADD |
| 16 | WAP F2 – 1 | 15 | ADD | SUB |

*FIG. 3b*

REAL BAU STAGE II

| I | II | III | IV | V |
|---|---|---|---|---|
| CLOCK PULSE | WAP F1 MEMORY 218 | WAP F2 MEMORY 220 | LEFT SUMMER 210 | RIGHT SUMMER 212 |
| 1 | 0 | WAP F1 + 2 | ADD | SUB |
| 2 | 1 | WAP F1 + 2 | ADD | SUB |
| 3 | 2 | WAP F1 − 2 | SUB | ADD |
| 4 | 3 | WAP F1 − 2 | SUB | ADD |
| 5 | 4 | WAP F1 + 2 | ADD | SUB |
| 6 | 5 | WAP F1 + 2 | ADD | SUB |
| 7 | 6 | WAP F1 − 2 | SUB | ADD |
| 8 | 7 | WAP F1 − 2 | SUB | ADD |
| 9 | 8 | WAP F1 + 2 | ADD | SUB |
| 10 | 9 | WAP F1 + 2 | ADD | SUB |
| 11 | 10 | WAP F1 − 2 | SUB | ADD |
| 12 | 11 | WAP F1 − 2 | SUB | ADD |
| 13 | 12 | WAP F1 + 2 | ADD | SUB |
| 14 | 13 | WAP F1 + 2 | ADD | SUB |
| 15 | 14 | WAP F1 − 2 | SUB | ADD |
| 16 | 15 | WAP F1 − 2 | SUB | ADD |

*FIG. 4a*

IMAGINARY BAU STAGE II

| I | II | III | IV | V |
|---|---|---|---|---|
| CLOCK PULSE | WAP F1 MEMORY 222 | WAP F2 MEMORY 224 | LEFT SUMMER 214 | RIGHT SUMMER 216 |
| 1 | WAP F2 + 2 | 0 | SUB | ADD |
| 2 | WAP F2 + 2 | 1 | SUB | ADD |
| 3 | WAP F2 − 2 | 2 | ADD | SUB |
| 4 | WAP F2 − 2 | 3 | ADD | SUB |
| 5 | WAP F2 + 2 | 4 | SUB | ADD |
| 6 | WAP F2 + 2 | 5 | SUB | ADD |
| 7 | WAP F2 − 2 | 6 | ADD | SUB |
| 8 | WAP F2 − 2 | 7 | ADD | SUB |
| 9 | WAP F2 + 2 | 8 | SUB | ADD |
| 10 | WAP F2 + 2 | 9 | SUB | ADD |
| 11 | WAP F2 − 2 | 10 | ADD | SUB |
| 12 | WAP F2 − 2 | 11 | ADD | SUB |
| 13 | WAP F2 + 2 | 12 | SUB | ADD |
| 14 | WAP F2 + 2 | 13 | SUB | ADD |
| 15 | WAP F2 − 2 | 14 | ADD | SUB |
| 16 | WAP F2 − 2 | 15 | ADD | SUB |

*FIG. 4b*

REAL BAU STAGE III

| I | II | III | IV | V |
|---|---|---|---|---|
| CLOCK PULSE | WAP F1 MEMORY 218 | WAP F2 MEMORY 220 | LEFT SUMMER 210 | RIGHT SUMMER 212 |
| 1 | 0 | WAP F1 + 4 | ADD | SUB |
| 2 | 1 | WAP F1 + 4 | ADD | SUB |
| 3 | 2 | WAP F1 + 4 | ADD | SUB |
| 4 | 3 | WAP F1 + 4 | ADD | SUB |
| 5 | 4 | WAP F1 − 4 | SUB | ADD |
| 6 | 5 | WAP F1 − 4 | SUB | ADD |
| 7 | 6 | WAP F1 − 4 | SUB | ADD |
| 8 | 7 | WAP F1 − 4 | SUB | ADD |
| 9 | 8 | WAP F1 + 4 | ADD | SUB |
| 10 | 9 | WAP F1 + 4 | ADD | SUB |
| 11 | 10 | WAP F1 + 4 | ADD | SUB |
| 12 | 11 | WAP F1 + 4 | ADD | SUB |
| 13 | 12 | WAP F1 − 4 | SUB | ADD |
| 14 | 13 | WAP F1 − 4 | SUB | ADD |
| 15 | 14 | WAP F1 − 4 | SUB | ADD |
| 16 | 15 | WAP F1 − 4 | SUB | ADD |

*FIG. 5a*

IMAGINARY BAU STAGE III

| I | II | III | IV | V |
|---|---|---|---|---|
| CLOCK PULSE | WAP F1 MEMORY 222 | WAP F2 MEMORY 224 | LEFT SUMMER 214 | RIGHT SUMMER 216 |
| 1 | WAP F2 + 4 | 0 | SUB | ADD |
| 2 | WAP F2 + 4 | 1 | SUB | ADD |
| 3 | WAP F2 + 4 | 2 | SUB | ADD |
| 4 | WAP F2 + 4 | 3 | SUB | ADD |
| 5 | WAP F2 − 4 | 4 | ADD | SUB |
| 6 | WAP F2 − 4 | 5 | ADD | SUB |
| 7 | WAP F2 − 4 | 6 | ADD | SUB |
| 8 | WAP F2 − 4 | 7 | ADD | SUB |
| 9 | WAP F2 + 4 | 8 | SUB | ADD |
| 10 | WAP F2 + 4 | 9 | SUB | ADD |
| 11 | WAP F2 + 4 | 10 | SUB | ADD |
| 12 | WAP F2 + 4 | 11 | SUB | ADD |
| 13 | WAP F2 − 4 | 12 | ADD | SUB |
| 14 | WAP F2 − 4 | 13 | ADD | SUB |
| 15 | WAP F2 − 4 | 14 | ADD | SUB |
| 16 | WAP F2 − 4 | 15 | ADD | SUB |

*FIG. 5b*

REAL BAU STAGE IV

| I | II | III | IV | V |
|---|---|---|---|---|
| CLOCK PULSE | WAP F1 MEMORY 218 | WAP F2 MEMORY 220 | LEFT SUMMER 210 | RIGHT SUMMER 212 |
| 1 | 0 | 0 | ADD | SUB |
| 2 | 1 | 1 | ADD | SUB |
| 3 | 2 | 2 | ADD | SUB |
| 4 | 3 | 3 | ADD | SUB |
| 5 | 4 | 4 | ADD | SUB |
| 6 | 5 | 5 | ADD | SUB |
| 7 | 6 | 6 | ADD | SUB |
| 8 | 7 | 7 | ADD | SUB |
| 9 | 8 | 8 | SUB | ADD |
| 10 | 9 | 9 | SUB | ADD |
| 11 | 10 | 10 | SUB | ADD |
| 12 | 11 | 11 | SUB | ADD |
| 13 | 12 | 12 | SUB | ADD |
| 14 | 13 | 13 | SUB | ADD |
| 15 | 14 | 14 | SUB | ADD |
| 16 | 15 | 15 | SUB | ADD |

*FIG. 6a*

IMAGINARY BAU STAGE IV

| I | II | III | IV | V |
|---|---|---|---|---|
| CLOCK PULSE | WAP F1 MEMORY 222 | WAP F2 MEMORY 224 | LEFT SUMMER 214 | RIGHT SUMMER 216 |
| 1 | 0 | 0 | SUB | ADD |
| 2 | 1 | 1 | SUB | ADD |
| 3 | 2 | 2 | SUB | ADD |
| 4 | 3 | 3 | SUB | ADD |
| 5 | 4 | 4 | SUB | ADD |
| 6 | 5 | 5 | SUB | ADD |
| 7 | 6 | 6 | SUB | ADD |
| 8 | 7 | 7 | SUB | ADD |
| 9 | 8 | 8 | ADD | SUB |
| 10 | 9 | 9 | ADD | SUB |
| 11 | 10 | 10 | ADD | SUB |
| 12 | 11 | 11 | ADD | SUB |
| 13 | 12 | 12 | ADD | SUB |
| 14 | 13 | 13 | ADD | SUB |
| 15 | 14 | 14 | ADD | SUB |
| 16 | 15 | 15 | ADD | SUB |

*FIG. 6b*

AUA FFT READ CONTROL: REAL AUA PIPELINE LEVEL 1

| I | II | III |
|---|---|---|
| CLOCK PULSE | REAL COMPONENT FROM OUTPUT 26 | REAL COMPONENT FROM OUTPUT 24 |
| 1 | DELAY (FFT) | DELAY (FFT) |
| 2 | DELAY (AUM LATENCY) | REG 0 (FILE 2) |
| 3 | DELAY (AUM LATENCY) | REG 1 (FILE 1) |
| 4 | DELAY (AUM LATENCY) | REG 2 (FILE 2) |
| 5 | DELAY (AUM LATENCY) | REG 3 (FILE 1) |
| 6 | DELAY (AUM LATENCY) | REG 4 (FILE 2) |
| 7 | DELAY (AUM LATENCY) | REG 5 (FILE 1) |
| 8 | DELAY (AUM LATENCY) | REG 6 (FILE 2) |
| 9 | DELAY (AUM LATENCY) | REG 7 (FILE 1) |
| 10 | REG 0 (FILE 1) | REG 8 (FILE 2) |
| 11 | REG 1 (FILE 2) | REG 9 (FILE 1) |
| 12 | REG 2 (FILE 1) | REG 10 (FILE 2) |
| 13 | REG 3 (FILE 2) | REG 11 (FILE 1) |
| 14 | REG 4 (FILE 1) | REG 12 (FILE 2) |
| 15 | REG 5 (FILE 2) | REG 13 (FILE 1) |
| 16 | REG 6 (FILE 1) | REG 14 (FILE 2) |
| 17 | REG 7 (FILE 2) | REG 15 (FILE 1) |
| 18 | REG 8 (FILE 1) | REG 0 (FILE 2) |
| 19 | REG 9 (FILE 2) | REG 1 (FILE 1) |
| 20 | REG 10 (FILE 1) | REG 2 (FILE 2) |
| 21 | REG 11 (FILE 2) | REG 3 (FILE 1) |
| 22 | REG 12 (FILE 1) | REG 4 (FILE 2) |
| 23 | REG 13 (FILE 2) | REG 5 (FILE 1) |
| 24 | REG 14 (FILE 1) | REG 6 (FILE 2) |
| 25 | REG 15 (FILE 2) | REG 7 (FILE 1) |

*FIG. 7a*

AUA FFT READ CONTROL: IMAGINARY AUA PIPELINE LEVEL 1

| I | II | III |
|---|---|---|
| CYCLE | IMAGINARY COMPONENT FROM OUTPUT 24 | IMAGINARY COMPONENT FROM OUTPUT 26 |
| 1 | DELAY (FFT) | DELAY (FFT) |
| 2 | REG 0 (FILE 1) | DELAY (AUM LATENCY) |
| 3 | REG 1 (FILE 2) | DELAY (AUM LATENCY) |
| 4 | REG 2 (FILE 1) | DELAY (AUM LATENCY) |
| 5 | REG 3 (FILE 2) | DELAY (AUM LATENCY) |
| 6 | REG 4 (FILE 1) | DELAY (AUM LATENCY) |
| 7 | REG 5 (FILE 2) | DELAY (AUM LATENCY) |
| 8 | REG 6 (FILE 1) | DELAY (AUM LATENCY) |
| 9 | REG 7 (FILE 2) | DELAY (AUM LATENCY) |
| 10 | REG 8 (FILE 1) | REG 0 (FILE 2) |
| 11 | REG 9 (FILE 2) | REG 1 (FILE 1) |
| 12 | REG 10 (FILE 1) | REG 2 (FILE 2) |
| 13 | REG 11 (FILE 2) | REG 3 (FILE 1) |
| 14 | REG 12 (FILE 1) | REG 4 (FILE 2) |
| 15 | REG 13 (FILE 2) | REG 5 (FILE 1) |
| 16 | REG 14 (FILE 1) | REG 6 (FILE 2) |
| 17 | REG 15 (FILE 2) | REG 7 (FILE 1) |
| 18 | REG 0 (FILE 1) | REG 8 (FILE 2) |
| 19 | REG 1 (FILE 2) | REG 9 (FILE 1) |
| 20 | REG 2 (FILE 1) | REG 10 (FILE 2) |
| 21 | REG 3 (FILE 2) | REG 11 (FILE 1) |
| 22 | REG 4 (FILE 1) | REG 12 (FILE 2) |
| 23 | REG 5 (FILE 2) | REG 13 (FILE 1) |
| 24 | REG 6 (FILE 1) | REG 14 (FILE 2) |
| 25 | REG 7 (FILE 2) | REG 15 (FILE 1) |

*FIG. 7b*

AUA FFT READ CONTROL: REAL AUA PIPELINE LEVEL 2

| I | II | III |
|---|---|---|
| CYCLE | REAL COMPONENT FROM OUTPUT 26 | REAL COMPONENT FROM OUTPUT 24 |
| 1 | DELAY (FFT) | DELAY (FFT) |
| 2 | DELAY (FFT) | DELAY (FFT) |
| 3 | DELAY (AUM LATENCY) | REG 0    (FILE 2) |
| 4 | DELAY (AUM LATENCY) | REG 1    (FILE 2) |
| 5 | DELAY (AUM LATENCY) | REG 2    (FILE 1) |
| 6 | DELAY (AUM LATENCY) | REG 3    (FILE 1) |
| 7 | DELAY (AUM LATENCY) | REG 4    (FILE 2) |
| 8 | DELAY (AUM LATENCY) | REG 5    (FILE 2) |
| 9 | DELAY (AUM LATENCY) | REG 6    (FILE 1) |
| 10 | DELAY (AUM LATENCY) | REG 7    (FILE 1) |
| 11 | REG 0    (FILE 1) | REG 8    (FILE 2) |
| 12 | REG 1    (FILE 1) | REG 9    (FILE 2) |
| 13 | REG 2    (FILE 2) | REG 10   (FILE 1) |
| 14 | REG 3    (FILE 2) | REG 11   (FILE 1) |
| 15 | REG 4    (FILE 1) | REG 12   (FILE 2) |
| 16 | REG 5    (FILE 1) | REG 13   (FILE 2) |
| 17 | REG 6    (FILE 2) | REG 14   (FILE 1) |
| 18 | REG 7    (FILE 2) | REG 15   (FILE 1) |
| 19 | REG 8    (FILE 1) | REG 0    (FILE 2) |
| 20 | REG 9    (FILE 1) | REG 1    (FILE 2) |
| 21 | REG 10   (FILE 2) | REG 2    (FILE 1) |
| 22 | REG 11   (FILE 2) | REG 3    (FILE 1) |
| 23 | REG 12   (FILE 1) | REG 4    (FILE 2) |
| 24 | REG 13   (FILE 1) | REG 5    (FILE 2) |
| 25 | REG 14   (FILE 2) | REG 6    (FILE 1) |
| 26 | REG 15   (FILE 2) | REG 7    (FILE 1) |

*FIG. 8a*

AUA FFT READ CONTROL: IMAGINARY AUA PIPELINE LEVEL 2

| I | II | III |
|---|---|---|
| CYCLE | IMAGINARY COMPONENT FROM OUTPUT 24 | IMAGINARY COMPONENT FROM OUTPUT 26 |
| 1 | DELAY (FFT) | DELAY (FFT) |
| 2 | DELAY (FFT) | DELAY (FFT) |
| 3 | REG 0 (FILE 1) | DELAY (AUM LATENCY) |
| 4 | REG 1 (FILE 1) | DELAY (AUM LATENCY) |
| 5 | REG 2 (FILE 2) | DELAY (AUM LATENCY) |
| 6 | REG 3 (FILE 2) | DELAY (AUM LATENCY) |
| 7 | REG 4 (FILE 1) | DELAY (AUM LATENCY) |
| 8 | REG 5 (FILE 1) | DELAY (AUM LATENCY) |
| 9 | REG 6 (FILE 2) | DELAY (AUM LATENCY) |
| 10 | REG 7 (FILE 2) | DELAY (AUM LATENCY) |
| 11 | REG 8 (FILE 1) | REG 0 (FILE 2) |
| 12 | REG 9 (FILE 1) | REG 1 (FILE 2) |
| 13 | REG 10 (FILE 2) | REG 2 (FILE 1) |
| 14 | REG 11 (FILE 2) | REG 3 (FILE 1) |
| 15 | REG 12 (FILE 1) | REG 4 (FILE 2) |
| 16 | REG 13 (FILE 1) | REG 5 (FILE 2) |
| 17 | REG 14 (FILE 2) | REG 6 (FILE 1) |
| 18 | REG 15 (FILE 2) | REG 7 (FILE 1) |
| 19 | REG 0 (FILE 1) | REG 8 (FILE 2) |
| 20 | REG 1 (FILE 1) | REG 9 (FILE 2) |
| 21 | REG 2 (FILE 2) | REG 10 (FILE 1) |
| 22 | REG 3 (FILE 2) | REG 11 (FILE 1) |
| 23 | REG 4 (FILE 1) | REG 12 (FILE 2) |
| 24 | REG 5 (FILE 1) | REG 13 (FILE 2) |
| 25 | REG 6 (FILE 2) | REG 14 (FILE 1) |
| 26 | REG 7 (FILE 2) | REG 15 (FILE 1) |

*FIG. 8b*

AUA FFT READ CONTROL: REAL AUA PIPELINE LEVEL 3

| I | II | III |
|---|---|---|
| CYCLE | REAL COMPONENT FROM OUTPUT 26 | REAL COMPONENT FROM OUTPUT 24 |
| 1 | DELAY (FFT) | DELAY (FFT) |
| 2 | DELAY (FFT) | DELAY (FFT) |
| 3 | DELAY (FFT) | DELAY (FFT) |
| 4 | DELAY (FFT) | DELAY (FFT) |
| 5 | DELAY (AUM LATENCY) | REG 0 (FILE 2) |
| 6 | DELAY (AUM LATENCY) | REG 1 (FILE 2) |
| 7 | DELAY (AUM LATENCY) | REG 2 (FILE 2) |
| 8 | DELAY (AUM LATENCY) | REG 3 (FILE 2) |
| 9 | DELAY (AUM LATENCY) | REG 4 (FILE 1) |
| 10 | DELAY (AUM LATENCY) | REG 5 (FILE 1) |
| 11 | DELAY (AUM LATENCY) | REG 6 (FILE 1) |
| 12 | DELAY (AUM LATENCY) | REG 7 (FILE 1) |
| 13 | REG 0 (FILE 1) | REG 8 (FILE 2) |
| 14 | REG 1 (FILE 1) | REG 9 (FILE 2) |
| 15 | REG 2 (FILE 1) | REG 10 (FILE 2) |
| 16 | REG 3 (FILE 1) | REG 11 (FILE 2) |
| 17 | REG 4 (FILE 2) | REG 12 (FILE 1) |
| 18 | REG 5 (FILE 2) | REG 13 (FILE 1) |
| 19 | REG 6 (FILE 2) | REG 14 (FILE 1) |
| 20 | REG 7 (FILE 2) | REG 15 (FILE 1) |
| 21 | REG 8 (FILE 1) | REG 0 (FILE 2) |
| 22 | REG 9 (FILE 1) | REG 1 (FILE 2) |
| 23 | REG 10 (FILE 1) | REG 2 (FILE 2) |
| 24 | REG 11 (FILE 1) | REG 3 (FILE 2) |
| 25 | REG 12 (FILE 2) | REG 4 (FILE 1) |
| 26 | REG 13 (FILE 2) | REG 5 (FILE 1) |
| 27 | REG 14 (FILE 2) | REG 6 (FILE 1) |
| 28 | REG 15 (FILE 2) | REG 7 (FILE 1) |

*FIG. 9a*

AUA FFT READ CONTROL: IMAGINARY AUA PIPELINE LEVEL 3

| I | II | III |
|---|---|---|
| CYCLE | IMAGINARY COMPONENT FROM OUTPUT 24 | IMAGINARY COMPONENT FROM OUTPUT 26 |
| 1 | DELAY (FFT) | DELAY (FFT) |
| 2 | DELAY (FFT) | DELAY (FFT) |
| 3 | DELAY (FFT) | DELAY (FFT) |
| 4 | DELAY (FFT) | DELAY (FFT) |
| 5 | REG 0 (FILE 1) | DELAY (AUM LATENCY) |
| 6 | REG 1 (FILE 1) | DELAY (AUM LATENCY) |
| 7 | REG 2 (FILE 1) | DELAY (AUM LATENCY) |
| 8 | REG 3 (FILE 1) | DELAY (AUM LATENCY) |
| 9 | REG 4 (FILE 2) | DELAY (AUM LATENCY) |
| 10 | REG 5 (FILE 2) | DELAY (AUM LATENCY) |
| 11 | REG 6 (FILE 2) | DELAY (AUM LATENCY) |
| 12 | REG 7 (FILE 2) | DELAY (AUM LATENCY) |
| 13 | REG 8 (FILE 1) | REG 0 (FILE 2) |
| 14 | REG 9 (FILE 1) | REG 1 (FILE 2) |
| 15 | REG 10 (FILE 1) | REG 2 (FILE 2) |
| 16 | REG 11 (FILE 1) | REG 3 (FILE 2) |
| 17 | REG 12 (FILE 2) | REG 4 (FILE 1) |
| 18 | REG 13 (FILE 2) | REG 5 (FILE 1) |
| 19 | REG 14 (FILE 2) | REG 6 (FILE 1) |
| 20 | REG 15 (FILE 2) | REG 7 (FILE 1) |
| 21 | REG 0 (FILE 1) | REG 8 (FILE 2) |
| 22 | REG 1 (FILE 1) | REG 9 (FILE 2) |
| 23 | REG 2 (FILE 1) | REG 10 (FILE 2) |
| 24 | REG 3 (FILE 1) | REG 11 (FILE 2) |
| 25 | REG 4 (FILE 2) | REG 12 (FILE 1) |
| 26 | REG 5 (FILE 2) | REG 13 (FILE 1) |
| 27 | REG 6 (FILE 2) | REG 14 (FILE 1) |
| 28 | REG 7 (FILE 2) | REG 15 (FILE 1) |

*FIG. 9b*

AUA FFT READ CONTROL: REAL AUA PIPELINE LEVEL 4

| I | II | III |
|---|---|---|
| CYCLE | REAL COMPONENT FROM OUTPUT 26 | REAL COMPONENT FROM OUTPUT 24 |
| 1 | REG 0 (FILE 1) | REG 0 (FILE 2) |
| 2 | REG 1 (FILE 1) | REG 1 (FILE 2) |
| 3 | REG 2 (FILE 1) | REG 2 (FILE 2) |
| 4 | REG 3 (FILE 1) | REG 3 (FILE 2) |
| 5 | REG 4 (FILE 1) | REG 4 (FILE 2) |
| 6 | REG 5 (FILE 1) | REG 5 (FILE 2) |
| 7 | REG 6 (FILE 1) | REG 6 (FILE 2) |
| 8 | REG 7 (FILE 1) | REG 7 (FILE 2) |
| 9 | REG 8 (FILE 2) | REG 8 (FILE 1) |
| 10 | REG 9 (FILE 2) | REG 9 (FILE 1) |
| 11 | REG 10 (FILE 2) | REG 10 (FILE 1) |
| 12 | REG 11 (FILE 2) | REG 11 (FILE 1) |
| 13 | REG 12 (FILE 2) | REG 12 (FILE 1) |
| 14 | REG 13 (FILE 2) | REG 13 (FILE 1) |
| 15 | REG 14 (FILE 2) | REG 14 (FILE 1) |
| 16 | REG 15 (FILE 2) | REG 15 (FILE 1) |

*FIG. 10a*

AUA FFT READ CONTROL: IMAGINARY AUA PIPELINE LEVEL 4

| I | II | III |
|---|---|---|
| CYCLE | IMAGINARY COMPONENT FROM OUTPUT 24 | IMAGINARY COMPONENT FROM OUTPUT 26 |
| 1 | REG 0 (FILE 1) | REG 0 (FILE 2) |
| 2 | REG 1 (FILE 1) | REG 1 (FILE 2) |
| 3 | REG 2 (FILE 1) | REG 2 (FILE 2) |
| 4 | REG 3 (FILE 1) | REG 3 (FILE 2) |
| 5 | REG 4 (FILE 1) | REG 4 (FILE 2) |
| 6 | REG 5 (FILE 1) | REG 5 (FILE 2) |
| 7 | REG 6 (FILE 1) | REG 6 (FILE 2) |
| 8 | REG 7 (FILE 1) | REG 7 (FILE 2) |
| 9 | REG 8 (FILE 2) | REG 8 (FILE 1) |
| 10 | REG 9 (FILE 2) | REG 9 (FILE 1) |
| 11 | REG 10 (FILE 2) | REG 10 (FILE 1) |
| 12 | REG 11 (FILE 2) | REG 11 (FILE 1) |
| 13 | REG 12 (FILE 2) | REG 12 (FILE 1) |
| 14 | REG 13 (FILE 2) | REG 13 (FILE 1) |
| 15 | REG 14 (FILE 2) | REG 14 (FILE 1) |
| 16 | REG 15 (FILE 2) | REG 15 (FILE 1) |

*FIG. 10b*

PIPELINED FAST FOURIER TRANSFORM PROCESSOR

BACKGROUND OF THE INVENTION

This invention relates to fast Fourier transform (FFT) processors, and particularly to those processors used for pipeline FFT operations for real-time or quasi-real time operation.

Many signal transmissions occur in environments in which they are corrupted by broad-band noise, which tends to obscure the signal. The Fourier transform of signal corrupted by noise often improves the detectability of the signal in the presence of such noise. In general, the Fourier transform of a time-varying signal used for communication or detection results in significant signal-related amplitude concentrated within a comparatively narrow frequency range. Specific applications of Fourier transforms include ranging and detection systems such as radar and sonar.

The fast Fourier transform (FFT) is a method which can be used with certain processors for reducing the time or computational effort involved in finding a discrete Fourier transform (DFT) in a digital processing system, as described in the article "A Guided Tour of the Fast Fourier Transform," by Bergland published at pp. 41–51 in the July 1969 issue of IEEE Spectrum. For systems such as radar and sonar which are used for guidance of ships and aircraft, it is important that the location display of targets be performed substantially real-time. In this context, real-time means that the display should correspond substantially to the current position of the targets, where currency is related to the speed of motion of the target or the vehicle in which the display is monitored. Thus, a delay of one second in the display of a ship might be tolerable, where the display is used solely for navigation, whereas for detection or guidance of missiles, much shorter processing times would be necessary.

Short processing times are often associated with processing by the pipeline technique, as opposed to batch processing. In the pipeline technique, sensor data continuously or almost continuously flows through a processor to produce a continuous stream of processed results, delayed only by the processor delay. A pipelined FFT processor is described in U.S. Pat. No. 3,816,729 issued June 11, 1974 in the name of Works. The Works pipeline processor implements the Cooley-Tukey FFT algorithm by cascading a plurality of units, each including a plurality of processors, each processor of which includes a multiplier and two summers, together with switching and delay circuits. The pipeline processor further includes a rotation vector memory and control logic for controlling the operations of the various cascaded units and processors. The Works system is disadvantageous because at each step of the butterfly processing a separate processor is required for each node, as for example FIG. 1 of Works illustrates a 3-stage system to produce an 8-point FFT, where the number of points may be calculated as $2^3=8$. The Works system requires one processor for each of the three steps, for a total of three processors. The amount of memory associated with each processor grows geometrically at each step of the processing, as illustrated for example in FIGS. 1 and 2 the article "Implementation Of A Pipeline FFT", by Sheats and Vickers, published NEREM 70, and in the article "A Pipeline Fast Fourier Transform" by Groginsky & Works, published Eascom 1969, so the amount of memory required may become large when several steps of processing are involved.

An improved FFT processor is desired, in which the memory requirements for the processors are equalized.

SUMMARY OF THE INVENTION

A Butterfly Arithmetic Unit (BAU) for use in conjunction with a cascade of other similar units in a pipeline FFT processor includes a multiplier for weighting one of the information signals and for applying the weighted signal to a summing circuit. The summing circuit sums another information signal with the weighted information signal from the multiplier to produce signals which are applied to a temporary store. The temporary stores in each BAU have the same capacity. The temporarily stored signals are read in pairs to produce output signals. The output signals are applied to the next Butterfly Arithmetic Unit in the cascade. In a particular embodiment of the invention, each BAU includes four registers for use as temporary stores, each of which has sixteen addressable memory locations, each of which is 24 bits wide to accommodate the input data format.

DESCRIPTION OF THE DRAWING

FIGS. 3a and 3b tabulate control states of summers and memory write address pointers of a BAU in the first position in a cascade of BAUs for real and imaginary information, respectively;

FIGS. 4a and 4b tabulate control states of summers and memory write address pointers of a BAU in the second position in a cascade of BAUs for real and imaginary information, respectively;

FIGS. 5a and 5b tabulate control states of summers and memory write address pointers of a BAU in the third position in a cascade of BAUs for real and imaginary information, respectively;

FIGS. 6a and 6b tabulate control states of summers and memory write address pointers of a BAU in the fourth position of a cascade of BAUs for real and imaginary information, respectively;

FIGS. 7a and 7b, FIGS. 8a and 8b, FIGS. 9a and 9b, and FIGS. 10a and 10b, are tables listing multiplexer configurations, memories to be read, and the addresses to be read in those memories, during operation of the arrangement of FIG. 2, for BAUs which are first, second, third and fourth, respectively, in a cascade of BAUs such as that of FIG. 1;

DESCRIPTION OF THE INVENTION

Figure 1:
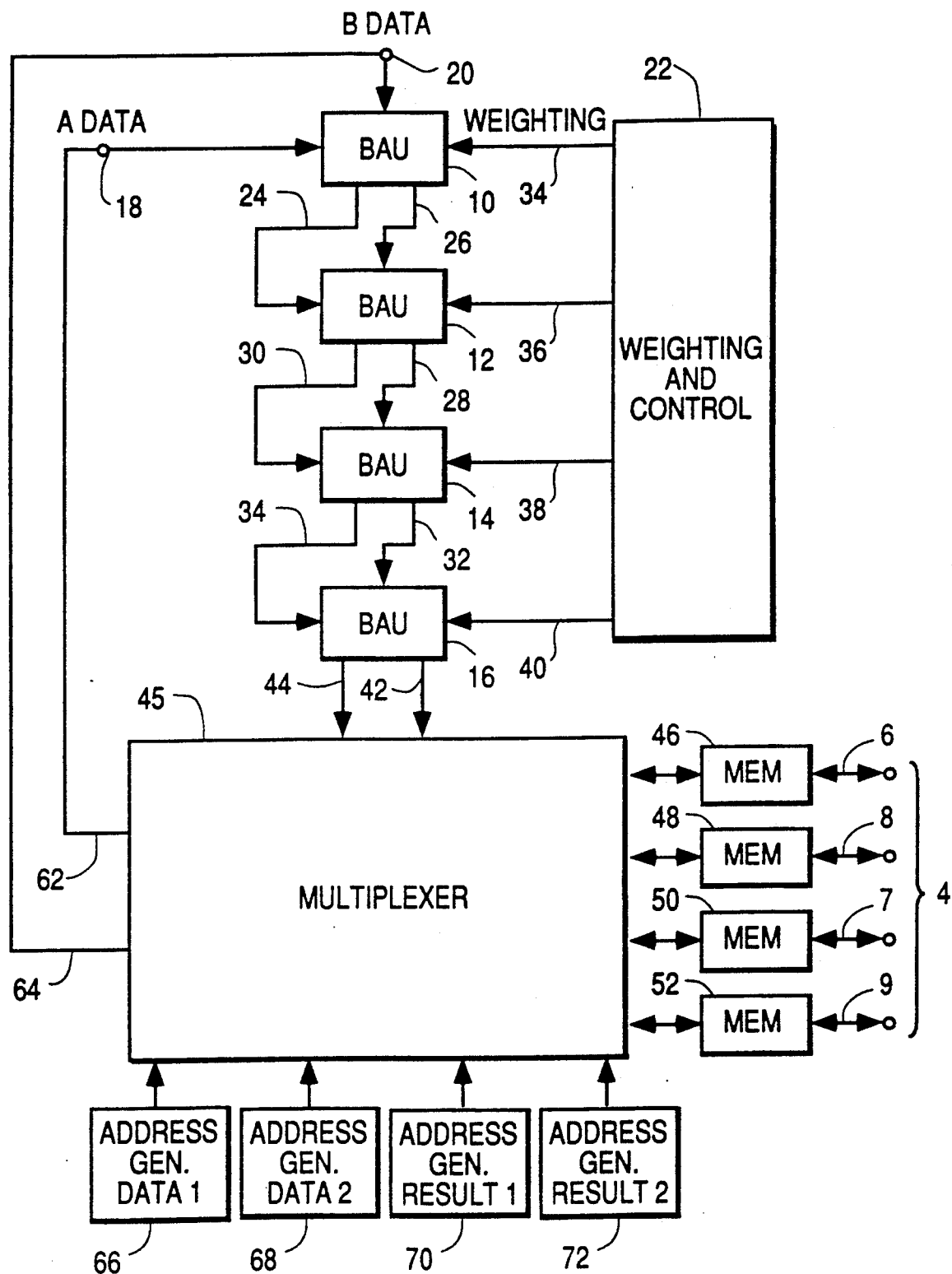
FIG. 1 is a simplified block diagram of an FFT processor according to the invention including a cascade of Butterfly Arithmetic Unit processors (BAU), memories and a feedback arrangement.

In FIG. 1, four substantially identical Butterfly Arithmetic Units (BAU) 10, 12, 14 and 16 are cascaded. Each BAU has two inputs and two outputs. BAU 10 receives data designated "A" and "B" at its input data paths or ports 18 and 20, respectively. The data received at ports 18 and 20 is a continuous stream of similarly clocked digital data. Each set of data is a stream of complex numbers representing samples of a waveform. Conventionally, the data received at ports 18 and 20 represents first and second halves of the sampled waveform, respectively. A weighting and control circuit illustrated as a block 22 produces weighting signals and timing signals for application to each of BAU 10, 12, 14 and 16. The weighting signals or coefficients produced by weighting and control block 22 are sines or cosine values of angles, where the magnitudes of the incremental angles are inversely related to the number of points in the FFT. The selection of the particular coefficients applicable to particular data points is well known to those skilled in the art. Butterfly Arithmetic Unit 10 processes the data received at ports 18 and 20 in accordance with weighting signals received over a data path 34, and generates a pair of output signals, which are applied over paths 24 and 26 to BAU 12. BAU 12 similarly receives weighting signals over a further path 36 and processes its input signals to produce signals on a further pair of outputs 28 and 30, which are applied as inputs to BAU 14. BAU 14 processes the input signals in conjunction with weighting signals received over a data path 38 to produce outputs on data paths 32 and 34 which are applied to the last BAU 16. BAU 16 processes the signals in conjunction with weighting signals received over data path 40 from weighting and control blocks 22. Butterfly Arithmetic Unit 16 produces output signal on output data paths 42 and 44. The output signal on data paths 42 and 44 represents a four-stage (16-point) FFT signal. Either more or less processing may be required, as described below.

A multiplexer 45 in FIG. 1 is coupled to digital RAM-type memories 46, 48, 50 and 52. The read and write addresses of memories 46, 48, 50 and 52 are controlled by address generators 66, 68, 70 and 72, respectively. A feedback path is completed by data paths 62 and 64 which extend from multiplexer 45 to input ports 18 and 20, respectively, of BAU 10.

Memories 46, 48, 50 and 52 are coupled to system input/output data paths or ports 6, 8, 7 and 9, respectively, of a bus 4, by which streams of input data can be applied to the memories for buffering and for coupling by multiplexer 45 and by paths 62 and 64 to the cascade of processors, and by which processed data produced at the output of BAU 16 and coupled to one or more of memories 46, 48, 50 and 52 may be stored therein for coupling to utilization means (not illustrated) by way of the associated output ports. Memories 46 and 48 may be considered to constitute a pair, and memories 50 and 52 likewise constitute a pair.

In operation, streams of clocked data words may be applied by way of paths 6 and 8 to memories 46 and 48, and may be temporarily stored therein if the incoming data rate exceeds the processing rate of the BAU processors or if the processing requires more than four stages of processing, as described below. The data is applied through multiplexer 45 to data paths 62 and 64, for application as "A" and "B" data, respectively, to inputs 18 and 20, respectively, of BAU 10.

BAU 10 processes the data, as described in detail below, to produce a pair of output signals on data paths 24 and 26 for application as A and B data, respectively, to BAU 12, the second processor in the cascade. BAU 12 processes its input data, and produces output data on data paths 28 and 30, which become the A and B data inputs for BAU 14. BAU 14 similarly processes its input data and produces outputs on data paths 32 and 34. The four-stage, 16-point FFT signals produced at the output from BAU 16 on data paths 42 and 44 may be coupled by multiplexer 45 to memories 50 and 52, respectively, where they are stored. The storage of data in memory pairs 46, 48 and 50, 52 is under the control of address generators 66 and 68, 70, 72 respectively.

For four-stage FFT (16-point FFT) processing, the processed signals produced on data paths 42 and 44 by BAU 16 require no further processing, and may be coupled through multiplexer 45 to memories 50 and 52 and bidirectional data paths 7 and 9. In those cases in which more than four stages of processing is required, the processed output signal from BAU 16 is applied to memories 50 and 52, and read out, generally in a rearranged order, back through multiplexer 45 and data paths 62, 64 to input ports 18 and 20, respectively, of BAU 10. Further stages of processing are then performed. For example, if five-stage FFT processing is desired, the data from memories 50 and 52 applied for a second pass through BAU 10 is processed in BAU 10, and the desired 5-stage processed signal becomes available on its output data paths 24 and 26. Since no further processing is required, the processed signals are "flushed" to data paths 42 and 44 by bypass paths (not illustrated) which bypass BAUs 12, 14 and 16. As is known in the art, such bypasses may be required to have delays corresponding to the processing delays of the BAUs in order to maintain synchronization. If six, seven or eight stages of FFT processing is desired, the output signals from BAU 16 resulting from a first pass through the four stages is temporarily stored in memories 50 and 52, read out in rearranged or reshuffled order as described in more detail below, and applied through multiplexer 45 to the inputs of BAU 10 to begin a second pass through two, three or all four stages of the cascade of BAUs, respectively.

For more than eight stages of processing (256-point FFT), the intermediate products produced at the output of BAU 16 are alternately applied by multiplexer 45 to memory pairs 46, 48 and 50, 52 in a "ping-pong" fashion. The intermediate products stored in each memory pair are reshuffled as mentioned above, and reapplied by way of multiplexer 45 and data paths 62 and 64 to the inputs of BAU 10. For example, for 10-stage processing, the input signals applied by way of input data paths 6 and 8 are temporarily stored in memories 46 and 48, and applied through multiplexer 45 and by way of data paths 62 and 64 to BAU 10 to start processing by a first pass through four stages of BAU. The output of BAU 16 on this first pass is coupled through multiplexer 45 to memories 50 and 52. The writing and reading of memories 50 and 52 reshuffles the data for application, back through multiplexer 45 and data paths 62, 64 to the inputs of BAU 10 to start a second pass through the cascade of BAU processors. The output of BAU 16 at the end of this second pass represents 8-stage processing (256 point FFT), so two more stages of processing are required. Memories 50 and 52 may still be reading data to the input of BAU 10, so multiplexer 45 is configured to couple the output of BAU 16 to memories 46 and 48. Memories 46 and 48 reshuffle the order of the data, and couple the reshuffled data back through multiplexer 45 and data paths 62, 64 to the input of BAU 10. Two more stages of processing are accomplished in BAUs 10 and 12, whereupon the desired 10-stage processing is completed. The outputs of BAU 12, on data paths 28 and 30, are flushed past BAUs 14 and 16, and are applied through multiplexer 45 to memories 50 and 52 where the signals are made available to an external utilizing apparatus (not illustrated).

While in the above examples the final output data is made available in memories 50 and 52, it may as readily become available in memories 46, 48.

The aforementioned Works system includes three stages, so it can perform an 8-point FFT. The feedback according to the invention allows the four-processor cascade to act as a 4N stage system or any number therebetween, where N refers to the number of recirculations. Thus, any number of stages of processing may be accomplished with only four stages of processor, which is especially advantageous considering that the memory requirements for additional stages grow geometrically. In general, the arrangement according to the invention may perform any number of stages of processing no matter how large, with relatively modest BAU processor internal memories, whereas Works' arrangement appears to require increases in internal memory size which may be impractical at the present state of the art above about 12 stages of processing. Also, the processor internal memory requirements vary among the Works processors, depending on their position in the cascade. It should be noted that the memories external to the BAU processors are commensurate as between WORKS' arrangement and arrangements according to the invention.

Figure 2:
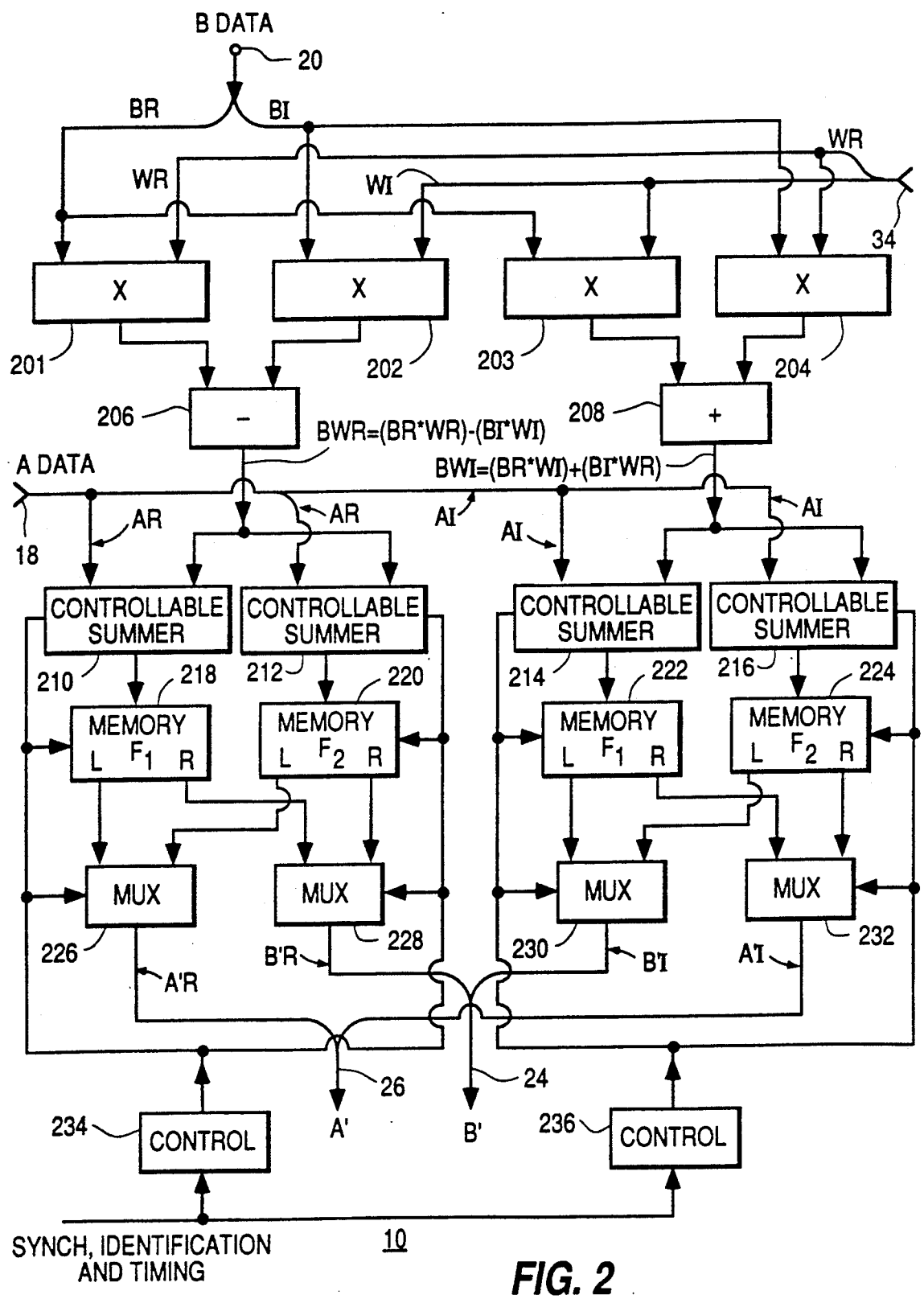
FIG. 2 is a simplified block diagram of one of the Butterfly Arithmetic Units of the cascade of FIG. 1.

FIG. 2 illustrates details of one of the BAU processors according to the invention, such as BAU processor 10 of FIG. 1. In FIG. 2, elements corresponding to those of FIG. 1 are designated by the same reference numerals. In FIG. 2, data arriving at BAU 10 by way of input ports 18 and 20 includes real and imaginary portions. The weighting signal received over data path 34 also includes real and imaginary portions.

The data applied to port 20 is designated B. The B data is divided into its real (BR) and imaginary (BI) portions, and the real portion BR is applied to a first input of a multiplier (X) 201. The real portion BR of the B data is also applied to a first input of a multiplier 203. Multiplier 201 receives at its second input the real portion of the weighting signal (WR) applied to BAU 10 over data path 34. A second input of multiplier 203 also receives from data path 34 the imaginary portion WI of the weighting signal. The imaginary portion of the B data (BI) from input port 20 is applied to first input ports of multipliers 202 and 204. The real portion WR of the weighting signal is applied to a second input of multiplier 204, and the imaginary portion WI of the weighting signal is applied to a second input of multiplier 202. Multipliers 201 and 202 multiply together their respective inputs to generate outputs which are applied to a subtracting or differencing (−) circuit illustrated as a block 206. Multipliers 203 and 204 multiply together their respective inputs and apply their outputs to an adding or summing (+) circuit illustrated as a block 208. The signals produced at the output of differencing circuit 206 represents the B data multiplied by the W data (BW), each with real and imaginary portions. The output of differencing circuit 206 represents the real component (BWR) of product BW, given by the equation:

$$BWR = (BR * WR) - (BI * WI) \qquad (1)$$

where * represents multiplication. The output of summing circuit 208 is the imaginary component (BWI) of product BW:

$$BWI = (BR * WI) + (BI * WR) \qquad (2)$$

The data applied to input port 18 is designated A data. The A data applied to input port 18 is divided into real (AR) and imaginary (AI) portions. The real portion AR is applied to first inputs of controllable summers 210 and 212, together with the BWR output of differencing circuit 206. The imaginary portion of the A data (AI) is applied to inputs of controllable summers 214 and 216, together with BWI signals from summing circuit 208. Summing circuits 210 and 212, 214 and 216 controllably sum together their respective input signals as described below, and apply the summed signals to inputs of memories illustrated as blocks 218, 220, 222 and 224, respectively, for temporary storage therein. At least some of the signals applied to inputs of memories 218, 220, 222 and 224 are conceptually applied at sequential memory locations. However, the memory locations are read in a manner described below, so that the stored information is read relative to the storage sequence in a manner which is delayed and alternated between memory outputs.

Each memory 218–224 has its N-bit output bus split to produce two identical N-bit outputs, designated L (left) and R (right). Thus, when a memory is read identical signals appear at its L and R outputs. As illustrated in FIG. 2, memory 218 includes an L output and an R output, which are separately coupled to first inputs of multiplexers (MUX) 226 and 228, respectively. Similarly, the L and R outputs of memory 220 are separately applied to second inputs of MUX 226 and 228, respectively. The L outputs of memories 222 and 224 are separately applied to inputs of MUX 230, and the R outputs of memories 222 and 224 are separately applied to inputs of MUX 232.

Multiplexers 226, 228, 230 and 232 merely couple the L and R outputs of the memories with which they are associated to a single output line. For example, MUX 226 selects the L signal from memory 218 or 220, as available, and couples it onto processor output data path 26. Similarly, MUX 228 selects the R output of memories 218 and 220, respectively, as available, and couples them onto processor output data path 24. MUX 230 and 232 perform the same functions for memories 222 and 224. Output data paths 24 and 26 represents the merged outputs of multiplexers 228, 230 and 226, 232, respectively. Control circuits 234 and 236 control summers 210-216, memories 218-224, and multiplexers 226-232, respectively, as described below.

Each BAU 10, 12, 14 and 16 of FIG. 1 receives information by a path (not illustrated) which identifies to the BAU its location in the cascade. This may be accomplished by indexed connectors for each location, by multiposition switches which are programmable at the time the cascade is assembled, by links which are cut for the same purpose, or the like. This information allows controllers 234 and 236 to implement different control sequences, depending upon the position of the BAU in the cascade.

FIGS. 3a and 3b represent the control algorithms of control blocks 234 and 236 of FIG. 2, respectively, for the case in which the Butterfly Arithmetic Unit is in the first stage of the cascade of FIG. 1, which is the stage represented by BAU 10. FIG. 3a relates to the summing and storage of real information received by summers 210 and 212 of FIG. 2.

In FIG. 3a, the condition during a recurrent cycle of 16 clock pulses is tabulated. The first column, designated I, tabulates the clock pulses of the recurrent cycle, as suggested by the heading "CLOCK PULSE". The second column, designated II, represents the memory address of the write address pointer (WAP) for memory 218 (F1) of FIG. 2 for each of clock cycles 1 . . . 16. The third column, designated III, represents the write address pointer (WAP) for memory 220 (F2) of FIG. 2. Columns II and III of FIG. 3a represent the steps involved in writing into memory the real component of the outputs of summers 210 and 212 of FIG. 2. The fourth and fifth columns of FIG. 3a, designated IV and V, are headed "LEFT SUMMER 210" and "RIGHT SUMMER 212", respectively, and represent the summer configuration to accomplish the summing process to be implemented during the various clock pulses of each recurrent cycle by controllable summers 210 and 212, respectively, of FIG. 2. For example, during clock pulse 1 of each recurrent cycle of sixteen clock pulses, data which was processed by summer 210 during an early portion of clock pulse 1 is stored at the memory location designated 0 in memory 218, and data which was processed by summer 212 is stored in a memory location designated WAP F1+1 in memory 220. Performing the indicated addition, during clock pulse 1, WAP F1=0, and the sum of 0+1=1. Thus, the memory location at which the output of summer 212 (FIG. 2) is stored during clock pulse 1 is memory location 1.

Also during clock pulse 1 of the recurrent cycle of 16 clock pulses tabulated in FIG. 3a, left summer 210 (FIG. 2) is configured to add together the BWR data and AR data applied to its inputs as indicated by the word "ADD" in column IV of FIG. 3a, while right summer 212 of FIG. 2 is configured to subtract during clock pulse 1, as indicated by "SUB" in column V of FIG. 3a.

In a similar manner, during clock pulse 2 of the recurrent cycle of 16 clock pulses tabulated in FIG. 3a, left memory 218 (FIG. 2) stores at address 1 the result of the subtraction which was performed by left summer 210 during an early portion of clock pulse 2. Also during clock pulse 2, right memory 220 stores at location WAP F1-1 the added signal produced during an early portion of clock pulse 2 by summer. 212. Memory address WAP F1-1 corresponds to 1−1=0. Thus, the signals stored in memories 218 and 220 during the first two clock cycles are stored at reversed addresses. During clock pulse 2, summers 210 and 212 are configured to subtract and add their input signals, respectively.

Storage continues in the same manner during subsequent clock pulses, with storage during clock cycle 3 occurring in memory 218 at memory address 2, and at memory address 3 of memory 220. Also during clock pulse 3, summer 210 adds and summer 212 subtracts. The process continues for 16 clock pulses, as specified by FIG. 3a, and then begins again at clock pulse 1 for the next following cycle of clock pulses.

FIG. 3b tabulates control of imaginary components at the outputs of controllable summers 214 and 216 of FIG. 2, and of the addresses of memories 222 and 224 in which the summer outputs are stored, by control 236 of FIG. 2, also for the situation in which the BAU is the first in the cascade of FIG. 1. FIG. 3b is similar to FIG. 3a, in that a recurrent cycle of 16 clock pulses is tabulated in column I. Column II, designated WAP F1, represents the write address pointer for memory 222, and column III, designated WAP F2, represents the write address pointer for memory 224. Column IV, designated "left summer 214" represents the control condition of summer 214 for each clock pulse, and column V, designated "right summer 216" represents the control condition of summer 216. During clock pulse 1 of a recurrent cycle of 16 clock cycles tabulated in column I of FIG. 3b, left summer 214 is configured to subtract (column IV), while right summer 216 is configured to add (column V). Also during clock cycle 1, the write address pointer for memory 224 (column III) causes the output of summer 216 to be stored at a memory address designated 0, while, referring to column II, memory 222 stores the output of summer 214 at memory location 0+1=1. During clock pulse 2 tabulated in FIG. 3b, memory 224 stores at memory location 1 the subtracted output produced by summer 216 during an early portion of the clock pulse, while memory 222 stores at a memory location 1−1=0 the added signal produced by summer 214. During clock pulse 16 (column I of FIG. 3b), memory 224 stores at address location 15 (column III) the subtracted output produced by summer 216 during clock pulse 16 (column V), and memory 222 stores at address 15−1=14 (column II) the added output produced by summer 214 during clock pulse 16 (column IV). At the next following clock pulse, the conditions correspond to those of clock pulse 1, and the cycle repeats. The control conditions during the other clock pulses tabulated in FIG. 3 will be obvious by reference to the FIGURE, without additional explanation.

The control sequence illustrated in FIGS. 3a and 3b does not include a description of control of multiplexers 226, 228, 230 or 232 of FIG. 2, because multiplexer control is required only during memory reading and not during memory writing.

As an overview of the control of memories and summers tabulated in FIG. 3a, it is noted that the control states simply alternate, i.e., WAP F1+1; WAP F1−1; WAP F1+1; ... The completion of a cycle of alternation occurs after a number of cycles equal to twice the address increment or decrement. Thus, in FIG. 3a the addresses are incremented or decremented by 1, and a complete cycle of alternation WAP F1+1; WAP F1−1 occurs in 2×1=2 clock pulses. There are eight such two-clock-pulse-cycles in the 16 clock pulse recurrence cycle tabulated in FIG. 3a. FIG. 3b is similar to FIG. 3a.

FIGS. 4a and 4b tabulate the write address pointer for memory pairs 218 and 220, and 222 and 224, respectively, and the control of controllable summer pairs 210 and 212, and 214 and 216, respectively, for the case in which the BAU is in the second stage position occupied by BAU 12 in FIG. 1. Clock pulses for the BAU which is in the second stage begin with clock pulse 1, which is not time-coincident with clock pulse 1 tabulated in FIGS. 3a and 3b for the BAU in the first stage of the cascade. Clock pulse 1 of FIGS. 4a (and 4b) occur at the time the first word of processed data arrives at an input of the second stage BAU, delayed from the first clock pulse of the first-stage BAU by the processing delay of the first stage BAU. This principle applies to all the stages of processing described below.

FIG. 4a tabulates control of controllable summers 210 and 212, and of the writing into memories 218 and 220, by control 234 of FIG. 2, for the situation in which the BAU is the second in the cascade of FIG. 1, occupying the position of BAU 12. Summers 210 and 212 receive real information AR and BWR. FIG. 4a thus tabulates the steps involved in writing into memory the real component at the outputs of summers 210 and 212 of FIG. 2 for the second BAU in the cascade. In FIG. 4a, during clock pulse 1 tabulated in column I, the output of controllable summer 210 is written into the address of memory 218 designated 0, as indicated by column II of FIG. 4a, headed "WAP F1". Also during clock pulse 1, the output of summer 212 of FIG. 2 is written into an address of memory 220 which is tabulated in column III as "WAP F1+2", corresponding to 0+2=2. Thus, the information written into memory 220 is spaced by two addresses from that written into memory 218. Also during clock pulse 1, left summer 210 is configured to add, and right summer 212 is configured to subtract, as indicated by columns IV and V of FIG. 4a. During clock pulse 2 tabulated in column I of FIG. 4a, the added signal which is produced at the output of summer 210 during clock pulse 2 is written into address 1 of memory 218 (column II), and the subtracted signal from the output of summer 212 is written into address location 1+2=3 of memory 220. During clock pulse 2, summer 210 is configured for addition (column IV), and summer 212 is configured for subtraction (column V). During clock pulse 3, the subtracted signal (Column IV) produced at the output of summer 210 during clock pulse 3 is written into address 2 of memory 218 (Column II), while the added signal produced at the output of summer 212 (Column V) is written into address 2−2=0 of memory 220 (Column III). During clock pulse 4, the subtracted signal produced at the output of summer 210 (Column IV) is written into memory address 3 of memory 218 (Column II), while the added signal produced at the output of summer 212 (Column V) is written into memory location 3−2=1 of memory 220 (Column III). Control of memory 218, memory 220, summers 210 and 212 continues as designated in the corresponding columns of FIG. 4a for 16 clock pulses, and then returns to the top of the table to begin again at clock pulse 1.

FIG. 4b tabulates control of summers 214 and 216, and memories 222 and 224 of FIG. 2, for the case in which the BAU is second in the cascade of FIG. 1, corresponding to BAU location 12. Summers 214 and 216 of FIG. 2 receive imaginary information AI and BWI. During clock pulse 1, the added output of summer 216 (Column V) is applied to memory address 0 of memory 224, as indicated by column III, headed "WAP F2", and the subtracted output of summer 214 (Column IV) is applied to memory address WAP F1+2=0+2=2 of memory 222, as tabulated in column II of FIG. 4b. During clock pulse 2, the added signal produced during clock pulse 2 by summer 216 (Column V) is stored at memory address 1 of memory 224 (column III), and the subtracted signal produced at the output of summer 214 during clock pulse 2 (Column IV) is stored at memory address 1+2=3 of memory 222 (Column II of FIG. 4b). The control of summers 214 and 216, and the write addressing of memories 222 and 224, continues as tabulated in FIG. 4b until clock pulse 16 of the recurrent cycle of clock pulses, after which it begins again at clock pulse 1 of the next following cycle.

Summarizing the operation tabulated in FIG. 4a, the cyclical offset of write address locations recurs every four clock pulses: WAP F1+2; WAP F1+2; WAP F1−2;- WAP F1−2; . . . The four-clock-pulse-cycle equals twice the address offset (2) of two address locations, i.e. 4=2×2. Four such four-clock-pulse-cycles occur in the 16 clock pulse recurrence cycle tabulated in FIG. 4a. FIG. 4b is similar to FIG. 4a.

FIG. 5a tabulates, for each clock pulse of a recurrent cycle of 16 clock pulses, the state of the write address pointers for memories 218 and 220, and the configuration of summers 210 and 212 during operation of a BAU such as that of FIG. 2 in the third position of a cascade of BAUs, corresponding to the position of BAU 14 of FIG. 1. The tabulation of FIG. 5a relates to the processing of real information.

As tabulated in FIG. 5a, during clock pulse 1 (column I) the data from summer 210 is written into memory address 0 of memory 218, as indicated in the column II, headed "WAP F1". Similarly, from column III for clock pulse 1, information from summer 212 is written into memory address WAP F1+4=0+4=4. During clock pulse 1, summer 210 is configured to add and summer 212 is configured to subtract, as indicated in Columns IV and V, respectively. During clock pulse 2, the information added (Column IV) by summer 210 during clock pulse 2 is written into memory 218 at address location 1, as indicated by the numeral 1 in column II of FIG. 5a. Also during clock pulse 2, the subtracted signal produced during clock pulse 2 at the output of summer 212 (Column V) is written into memory address WAP F1+4=1+4=5 of memory 220, as indicated in column III. In FIG. 5a, the write address pointer for memory 218 continually increments during the 16 clock pulses, taking on values ranging from 0 to 15. The write address pointer for memory 220, as tabulated in column 3, has a value which is the value of the write address pointer of memory 218 to which is either added or subtracted the value 4, on a recurrent 4-clock-pulse basis. Thus, during clock pulses 1 through 4, the write address as tabulated in column III of FIG. 5a is "WAP F1+4", and during the next four clock pulses, namely clock pulses 5–8, the tabulated value of the write address pointer for memory 220 is listed as "WAP F1−4". This is an eight-clock-pulse-cycle. Similarly, during clock pulses 9 through 12, memory 220 writes into address four greater than the address of memory 218 and during the last four clock pulses of the recurrent cycle, namely clock pulses 13–16, memory 220 is written into at addresses which are four less than the corresponding address of memory 218. Thus, the write address for memory 220 is four greater or four less than the corresponding address of memory 218, cycling at an eight clock pulse rate. The configuration of the left summer 210 and right summer 212 cycles between add and subtract configuration on the same eight-clock-pulse basis.

FIG. 5b tabulates write addresses for memories 222 and 224, and the configurations of summers 214 and 216, for a BAU occupying the third position in a cascade of BAUs, corresponding to the location of BAU 14 of FIG. 1, and for imaginary information. FIG. 5b is generally similar to FIG. 5a. In FIG. 5b, memory 224 is written into at addresses 0, 1, 2, . . . 15 (column III) over the course of 16 clock pulses of the recurrent cycle of clock pulses. Memory 222 is written into at addresses either four greater than or four less than the corresponding write address of memory 224 (column II), cycling on an eight-clock-pulse basis, just as does memory 220 as tabulated in column III of FIG. 5a. Two such eight-clock-pulse cycles occur during the tabulated 16-clock-pulse recurrent cycle. The tabulations of the configuration of summer 214 and summer 216 in columns IV and V of FIG. 5b indicate that the configuration remains the same for four clock pulses, and then changes at each increment of four clock pulses, just as was the case in FIG. 5a for summers 210 and 212.

FIGS. 6a and 6b tabulate the write pointer address for memory pairs 218, 220; and 222, 224, respectively, and the states of summer pairs 210, 212; 214, 216, respectively, for clock pulses 1 through 16 of a recurrent cycle of 16 clock pulses. The memory address pointers for memories 218, 220, 222 and 224, as tabulated in columns II and III of FIG. 6a, and II and III of FIG. 6b, respectively, are each 0 at the first clock pulse, and increment by unity for each clock pulse through clock pulse 16. One complete cycle of write address pointers occurs in 16 clock pulses, without increments or decrements. The summer configurations tabulated in columns IV and V of FIGS. 6a and 6b remain in the same condition for the first eight clock pulses of each recurrent cycle, and switch to a second condition for the remaining eight clock pulses of each recurrent cycle of 16 clock pulses.

Recapitulating the cycling of the summer configuration and the memory address pointer value for BAUs in the first, second, third and fourth positions in the cascade, it is noted that in the first position of the cascade a complete cycle of alternation occurs in two clock pulses for the first position, in four clock pulses for the second position, and eight clock pulses for the third position and in 16 clock pulses in the fourth position, while the temporal offset, either plus of minus, for each position is half the alternation cycle, i.e. 1, 2, 4, for the first, second and third stages, respectively. There is no offset for the fourth stage because the data is written to memory as described below and is reconfigured in the memory as required.

The reading of stored information from memories 218, 220; 222, 224 and the multiplexing together of the information read from the memories, is also under the control of controllers 234 and 236 of FIG. 2. FIG. 7a tabulates the control states for reading real information from memories 218 and 220 of FIG. 2, and for multiplexing of the information, for a BAU occupying a cascade position corresponding to that of BAU 10 of FIG. 1. It should particularly be noted that FIG. 7a relates only to the real component of the information read from memories 218 and 220 of FIG. 2 and produced on output data paths 24 and 26 of the BAU. The imaginary component is read from memories 222 and 224, and is controlled as described below in conjunction with FIG. 7b. Column I of FIG. 7a tabulates the clock pulses. Column II represents the conditions under which real data is read to or appears at output data path 26, while column III represents the conditions under which a real data component is read to or appears at output data path 24.

In FIG. 7a, the column (columns II or III) in which a notation appears indicates which of the two output data paths (path 26 or 24, respectively) it affects, and therefore indicates which of multiplexers 226 or 228 is affected. For example, column II of FIG. 7a relates to the real component of the signal on output data path 26, and therefore the "File 1" or "File 2" notations in Column II refer to multiplexer 226. In particular, the "File 1" notation means that multiplexer 226 reads from the left (L) output of memory 218, and the "File 2" notation means that multiplexer 226 reads from Left (L) output of memory 220. The register or "REG" notation in either column II or III of FIG. 7a identifies the address of memories 218 and 220 which is read. As a similar example, column III of FIG. 7a relates to the real signal component of output data path 24, and therefore its "File 1" or "File 2" notation relates to the condition of multiplexer 228 in reading from the R outputs of memories 218 and 220, respectively. Thus, in FIG. 7a, "File 1" may be interpreted to mean a signal originating from memory 218, and "File 2" means a signal originating from memory 220.

In FIG. 7a, the tabulation in column I includes a 16-clock-pulse recurrent cycle as in FIGS. 3–6, and also includes information relating to the operation at initial turn-on (clock pulses 1 through 9), when the information first begins to flow into the cascade over data paths 62 and 64 (FIG. 1). In particular, in FIG. 7a, the recurrent portion of the cycle is the portion extending from clock pulses 10 through clock pulse 25, with the return arrow 710 representing the return to the condition of clock pulse 10 for the beginning of the next recurrence cycle. During clock pulses 1 through 9, the operation of multiplexers 226 and 228, and the reading of memories 218 and 220, may be viewed as being atypical. In particular, during clock pulses 1 through 9, for each stage of the cascade, the multiplexers and memories are read and produce outputs at data paths 24 and 26, but the data is not accepted by the next BAU stage of the cascade, so the memories or the multiplexers may be viewed as being inhibited during certain clock pulses.

The delay of clock pulse 1 as tabulated in column Columns II and III of FIG. 7a is attributable to the requirements of the FFT algorithm, while the delay of clock pulses 2 through 9 in column II is attributable to the period of time required for B data to flow from B data input terminal 20 of FIG. 2 to the outputs of summers 206 or 208 of FIG. 2.

During clock pulse 2, address or register (REG) 0 of memory 220 (File 2) is read (Column III of FIG. 7a). The stored data in memory 220 is read at address 0 and appears at both left (L) and right (R) outputs of the memory. The notation "File 2" in column III indicates that multiplexer 228 is configured to couple to data path 24 the data being read from the R output of memory 220, and is configured so as not to couple to the R side of memory 218.

During clock pulse 3, column II of FIG. 7a notes "DELAY", thereby indicating that the real part of signals read to output data path 26 are not used by the next stage in the cascade; this may be viewed as inhibiting multiplexer 226. During clock pulse 3, column III (relating to data path 24) bears the notation "File 1", thereby indicating that memory 218 is read, and the notation "REG 1" indicates that it is read at address location 1, and memory 218 therefore produces mutually identical output signals at both its L and R outputs. Memories 218 and 220 may be, and in general are, loaded with different data, so the information may not be identical as between outputs of different memories.

Referring now to clock pulse 4 tabulated in column I of FIG. 7a, a "DELAY" notation appears in column II, so multiplexer 226 is viewed as inhibited. The "File 2" notation in Column III means that data is read to output data path 24 from the R output of memory 220 and not from the R output of memory 218, and the "REG 2" notation in column III means that memory 220 is read at address location 2.

From clock pulse 5 to clock pulse 9, column II of FIG. 7a bears the "DELAY" notation, whereby multiplexer 226 continues to be viewed as inhibited. Also during clock pulses 5 to 9, the memory addresses which are read increment from address 3 to address 7. Multiplexer 228 (associated with output data path 24) alternates its configuration (i.e., alternates from "File 1" to "File 2") to alternately couple from the R output of memories 218 and 220.

Beginning with clock pulse 10 of FIG. 7a, both columns II and III of FIG. 7a bear notations other than "DELAY", thereby indicating that both multiplexers produce usable (or used) outputs In particular, during clock pulse 10, multiplexer 226 (because we are reading column II) reads from the L output (File 1) of the associated memory, which by reference to FIG. 2 is seen to be memory 218. Memory 218 is read at address location zero (REG 0). Also during clock pulse 10, and referring to column III, multiplexer 228 reads from the R output of memory 220 (File 2) that information which is stored at address location 8 (REG 8).

During clock pulse 11, reference to column II of FIG. 7a indicates by the notation "File 2" that multiplexer 226 reads from memory 220, and by "REG 1" indicates that memory 220 is read at address location 1. Reference to column III indicates by "File 1" that multiplexer 228 reads from memory 218, and by "REG 9", that address location 9 of memory 218 is read.

The configuration of the reading of the real component of data from memories 218 and 220 can be understood for the remaining clock pulses from the above description in conjunction with FIG. 7a. After clock pulse 25 is completed, the configuration returns to that indicated by clock pulse 10, and operation continues in a recurrent cycle.

FIG. 7b is similar to FIG. 7a in that it relates to a BAU which is the first stage of a cascade, but relates to the configurations of multiplexers and memories for the imaginary (as opposed to real) portion of the data coupled onto output data paths 24 and 26 of FIG. 2. As a consequence of representing memory and multiplexer configurations which handle the imaginary portions of the data, the notations of FIG. 7b tabulate reading of memories 222 and 224 of FIG. 2, in the case of FIG. 7a, FIG. 7b includes delays attributable to the FFT algorithm itself ("DELAY(FFT)"), and due to processing ("AUM LATENCY").

During clock pulse 1 tabulated in FIG. 7b, both multiplexers are "inhibited", as indicated by the "Delay" notation. During clock pulses 2 through 9, signals are not coupled onto data path 26, as indicated by the "delay" notations in column III. As indicated by the "File" and "Reg" notations in Column II, signals are coupled onto output data path 24 during clock pulses 1-9. Therefore, during clock pulses 2-9 (where the hyphen represents the word "through") the notations "File 1" and "File 2" refer only to multiplexer 230. The multiplexer configuration alternates between reading memory 222 (File 1) and memory 224 (File 2) during clock pulses 1-9. During clock pulse 2, the L output of memory 222 is read at address 0; during clock pulse 3, the L output of memory 224 is read at address 1; and during clock pulse 4, the L output of memory 222 is read at address 2. The alternation of multiplexer 230 continues to and after clock pulse 10.

As in the discussion of FIG. 7a, during clock pulse 10, both multiplexers 230 and 232 produce usable outputs. In particular, column II indicates that multiplexer 230 reads address 8 from memory 222 by the L output, and column III indicates that multiplexer 232 reads address 0 from memory 224. During clock pulse 11, multiplexer 230 reads address 9 from memory 224 (Column II), and multiplexer 232 reads address 1 from memory 222 (Column III). The remaining configurations for clock pulses 12-25 should be apparent from a comparison of the above discussion and FIG. 7b. After clock pulse 25, the configuration returns to that of clock pulse 10 and continues in a recurrent cycle.

The recurrent cycles described by FIGS. 7a for real data and FIG. 7b for imaginary data operate concurrently, to produce a stream of real and imaginary data on each of output data paths 24 and 26 after the initial start-up period. The stream of data produced on data paths 24 and 26 in accordance with the operation described in conjunction with FIGS. 7a and 7b is that which is produced when the BAU is the first in the cascade. The operation of a BAU in the second stage of the cascade is represented by FIGS. 8a and 8b.

FIG. 8a tabulates the operation of memories 18 and 220, and multiplexers 226 and 228 of FIG. 2, for producing real components of data on output data paths 26 and 24 when the particular BAU is second in a cascade. Delays attributable to the FFT algorithms inhibit both multiplexers 226 and 228 during clock pulses 1 and 2. During clock pulses 3-10 as tabulated in column I of FIG. 8a, column II indicates "DELAY", and therefore multiplexer 226 is "inhibited." During clock pulses 3 and 4 of FIG. 8a, multiplexer 228 reads the R output of memory 220 ("File 2" notation in column III for both clock pulses 3 and 4), at address 0 during clock pulse 3 (REG 0) and at address 1 during clock pulse 4 ("REG 1"). During clock pulses 5 and 6, multiplexer 228 reads the R output of memory 218 ("File 1") at addresses 2 and 3 ("REG 2 and 3"), respectively. During clock pulses 7 and 8, multiplexer 228 reads the R output of memory 220 (File 2) at locations 4 and 5, respectively, and during clock pulses 9 and 10 multiplexer 228 reads the R output of memory 218 at addresses 6 and 7, respectively.

Beginning with clock pulse 11 of FIG. 8a, both multiplexers 226 and 228 of FIG. 2 produce usable outputs. Referring to column II, multiplexer 226 reads from the L output of memory 218 (File 1) at addresses 0 and 1 during clock pulses 11 and 12, respectively, and referring to column III, multiplexer 228 reads from the R output of memory 220 (File 2) at address locations 8 and 9, respectively. The reading continues to clock cycle 26, and then returns to the conditions associated with clock pulse 11 for a recurrent operating cycle of 16 clock pulses. Each multiplexer configuration is assumed for two consecutive clock pulses, i.e., during clock cycles 11 and 12 multiplexer 226 remains in the File 1 configuration reading memory 218, and multiplexer 228 remains in the File 2 configuration for reading memory 220. The addresses being read increment by one address per clock pulse.

FIG. 8b tabulates the operation of memories 222 and 224, and multiplexers 230 and 232 of FIG. 2, for producing imaginary components of data on output data paths 24 and 26 when the particular BAU is second in a cascade. Clock pulses correspond to those of FIG. 8a. Delays attributable to the FFT algorithm inhibit both multiplexers 230 and 232 during clock pulses 1 and 2. During clock pulses 3-10 as tabulated in Column I of FIG. 8b, Column III indicates "DELAY", and therefore multiplexer 232 is "inhibited". During clock pulses 3 and 4 of FIG. 8b, multiplexer 230 reads the L output of memory 222 ("File 1" notation in Column II for both clock pulses 3 and 4), at address 0 during clock pulse 3 (REG 0), and at address 1 during clock pulse 4 (REG 1). During clock pulses 5 and 6, multiplexer 230 reads the L output of memory 224 (File 2) at addresses 2 and 3 ("REG 2" and "REG 3", respectively). During clock pulses 7 and 8, multiplexer 230 reads the L output of memory 222 ("File 1") at locations 4 and 5, respectively, and during clock pulses 9 and 10 multiplexer 230 reads the L output of memory 224 at addresses 6 and 7, respectively.

Beginning with clock pulses 11 and 12 of FIG. 8b, both multiplexers 230 and 232 of FIG. 2 produce usable outputs. Referring to Column III, multiplexer 232 reads from the R output of memory 224 at address locations 0 and 1, respectively, and referring to Column II, multiplexer 230 reads from the L output of memory 222 at addresses locations 8 and 9, respectively. The reading continues to clock pulse 26, and then returns to the conditions associated with clock pulse 11 for a recurrent operating cycle of 16 clock pulses. Each multiplexer configuration is assumed for two consecutive clock pulses, as with FIG. 8a. The addresses being read increment by one address per clock pulse.

FIGS. 9a and 9b tabulate information relating to multiplexer configuration and memory reading for the BAU of FIG. 2 which is in the third stage of the cascade of FIG. 1. FIG. 9a relates to real information components coupled onto output data path 24 and 26, and FIG. 9b relates to imaginary components. Column I of FIGS. 9a and 9b tabulates clock pulses which correspond to those of FIGS. 7 and 8 in the manner described above. Column II of FIG. 9a and column III of FIG. 9b relate to memories and multiplexers which couple onto output data path 26, and column III of FIG. 9a and column II of FIG. 9b relate to memories and multiplexers which couple onto output data path 24.

In FIG. 9a, the "DELAY" notation during clock pulses 1-4 indicates that the multiplexers are "inhibited". During clock pulses 5-12, the "DELAY" notation in column II indicates that the multiplexer supplying output data path 26 is "inhibited", while the notations in column III describe the operating state of multiplexer 228. In particular, during clock pulses 5-8, multiplexer 228 is in the "File 2" state, corresponding to reading from the R output of memory 220. The address at which memory 220 is read increments by one during each clock cycle. During clock cycles 9-12, multiplexer 228 is in the "File 1" state, reading from the R output of memory 218. Beginning with clock cycle 13, which is the beginning of the recurrent cycle of 16 clock pulses, both multiplexers take on states which are maintained for periods of four clock pulses. For example, during clock pulses 13-16, multiplexer 226 remains in the "File 1" state, while multiplexer 228 remains in the "File 2" state. At clock pulse 17, they switch, and hold their respective states until clock pulse 20. Operation continues to clock pulse 28, after which the configuration returns to that of clock pulse 13, thereby beginning anew the recurrent cycle of 16 clock pulses.

From the above discussion, in conjunction with FIG. 9b, the operation of the multiplexers and memories should be apparent for the imaginary components of signals on output data paths 24 and 26 of a BAU in the third position of a cascade. As in FIG. 9a, full cyclic operation does not begin until clock pulse 13, and the multiplexers maintain the same state for four consecutive clock pulses.

FIG. 10a tabulates multiplexer states and memory addresses for producing real signal components on output data paths 24 and 26 of a BAU which is fourth in the cascade of FIG. 1. As illustrated in FIG. 10a, there is no delay, and all outputs are used immediately. The recurrence occurs in 16 pulses. The "File 1" notation in column II for clock pulses 1-8 indicate that multiplexer 226 reads from the L output of memory 218 for the first eight pulses of the recurrent cycle of pulses. Similarly, the "File 2" notation in column III for clock pulses 1-8 indicates that multiplexer 228 reads from the R output of memory 220. From clock pulse 9 to 16, the multiplexers assume the opposite states. From the above discussion, the meaning of the tabulation of FIG. 10b should be clear.

As so far described, the cascade of four BAUs may be used for one-, two-, three- or four-stage FFT processing (two-, four-, eight- or sixteen-point FFT). As mentioned, this is performed by applying the input signals over data paths 6 and 8 of FIG. 1, through multiplexer 45 to the inputs of BAU 10, by flushing the signal to data paths 42 and 44 after the desired number of stages of processing, and by coupling the resulting signals to memories 50 and 52 for use application to a utilization apparatus.

Regardless of the number of passes or partial passes through the cascade of four stages, the data initially applied to memories 46 and 48 from the external source is scrambled before it is applied to BAU 10 for an initial step of processing, as described below.

In particular, for any FFT processing, the incoming data from data paths 6 and 8 is written into, and read from, memories 46 and 48 in a sequence which results in scrambling of the data words. Such scrambling may be accomplished by writing into memory in a scrambled order and reading in a normal sequence (0, 1, 2, 3 . . . ), or vice versa. For simplicity, it is assumed that the data arriving at memories 46 and 48 from data paths 6 and 8 is written into the memories in normal sequence. Each of memories 46 and 48 may be said to contain half of the input data points, with memory 46 containing the first half and memory 48 containing the second half. Memories 46 and 48 are read in a bit-reversed address sequence (described below), and the data so read is applied, by way of multiplexer 45 and data paths 62, 64 to the input ports of BAU 10 to begin a first pass through the cascade of BAUs of FIG. 1. The bit reversed sequence is generated from a normal monotonic digital sequence (expressed as a decimal sequence 0, 1, 2, 3 . . . ) by reversing the positions of digits of a particular larger significance with the digits of the same lesser significance, as by reversing the MSB and LSB, the 2nd MSB with the 2nd LSB and so forth. TABLE I illustrates a bit-reversed sequence for a 3-bit word.

TABLE I

| NORMAL SEQUENCE | | REVERSE SEQUENCE | |
| --- | --- | --- | --- |
| Decimal | Binary | Binary | Decimal |
| 0 | 000 | 000 | 0 |
| 1 | 001 | 100 | 4 |
| 2 | 010 | 010 | 2 |
| 3 | 011 | 110 | 6 |
| 4 | 100 | 001 | 1 |
| 5 | 101 | 101 | 5 |
| 6 | 110 | 011 | 3 |
| 7 | 111 | 111 | 7 |

The number of bits in the address sequence depends on the number of words to be stored, and therefore depends upon the window size. The 3-bit address of TABLE I is suitable for an 8-word window. TABLE II lists the normal and bit-reversed sequences for a 4-bit address sequence (window of 16 words).

TABLE II

| NORMAL SEQUENCE | | BIT-REVERSED SEQUENCE | |
| --- | --- | --- | --- |
| Decimal | Binary | Binary | Decimal |
| 0 | 0000 | 0000 | 0 |
| 1 | 0001 | 1000 | 8 |
| 2 | 0010 | 0100 | 4 |
| 3 | 0011 | 1100 | 12 |
| 4 | 0100 | 0010 | 2 |
| 5 | 0101 | 1010 | 10 |
| 6 | 0110 | 0110 | 6 |
| 7 | 0111 | 1110 | 14 |
| 8 | 1000 | 0001 | 1 |
| 9 | 1001 | 1001 | 9 |
| 10 | 1010 | 0101 | 5 |
| 11 | 1011 | 1101 | 13 |
| 12 | 1100 | 0011 | 3 |
| 13 | 1101 | 1011 | 11 |
| 14 | 1110 | 0111 | 7 |
| 15 | 1111 | 1111 | 15 |

The bit-reverse reading of memories 46 and 48 to couple data to the cascade for the first pass therethrough applied only to the first reading, no matter how many passes through the cascade are required.

The dimensions of memories 46, 48 (and 50 and 52) are selected to store $\frac{1}{2}(2^N)$ words, where N is the maximum number of stages of processing which may be desired. A major advantage of the described arrangement is that the number of stages of processing may be increased simply by increasing the storage capacity of the external memories (memories 46, 48, 50 and 52 of FIG. 1) without any change in the amount of storage capacity within memories 218, 220, 222 and 224 of FIG. 2.

The number of bits of the bit-reversed read addresses must correspond to the number of addresses into which data is to be loaded. In general, the number of word storage capacity of each memory equals half the number of points in the FFT. For example, four-stage processing (16-point FFT) requires that each memory 46, 48, 50 and 52 have the capacity to store a number of words equal to 16/2=8. In order to address eight memory locations, the address word must have three bits. Similarly, five-stage processing (32-point FFT) requires 32/2=16 word storage locations in each external memory 46, 48, 50 and 52, and the address word for reading or writing must have four bits. The 3-bit bit-reversed sequence of Table I would be adequate for read addressing the memories for a 16-point FFT, but the four-bit sequence of Table II would be required for the 32-point FFT.

Table III tabulates the bit-reversed sequence for a five-bit binary word, which may be used for a 64-point FFT.

TABLE III

| NORMAL SEQUENCE | | BIT-REVERSED SEQUENCE | |
| --- | --- | --- | --- |
| Decimal | Binary | Binary | Decimal |
| 0 | 00000 | 00000 | 0 |
| 1 | 00001 | 10000 | 16 |
| 2 | 00010 | 01000 | 8 |
| 3 | 00011 | 11000 | 24 |
| . | . | . | . |
| . | . | . | . |
| . | . | . | . |
| 28 | 11100 | 00111 | 7 |
| 29 | 11101 | 10111 | 23 |
| 30 | 11110 | 01111 | 15 |
| 31 | 11111 | 11111 | 31 |

When one, two, three or four states of processing (two-, four-, eight- and sixteen-point FFT, respectively) are desired, only one pass through the cascade of BAU processors of FIG. 1 is required, flushing the data past those BAUs whose processing is not required Processed data appears at data paths 42 and 44 at the output of BAU 16, and is to be made available to the utilization apparatus external to FIG. 1. Processed data may become available at data paths 42 and 44 before reading of data from memories 46 and 48 to the inputs of BAU 10 is completed. Multiplexer 45 is therefore configured to couple the processed data from data paths 42 and 44 to memories 50 and 52. Memories 50 and 52 are addressed in normal sequence for writing, and are read in due course by the utilization apparatus, also in normal sequence. Thus, memories 50 and 52 operate as simple buffers when four or less stages of FFT processing are desired.

When five, six, seven or eight stages of processing are desired (32, 64, 128, 256-point FFT, respectively), a first complete pass of the signal through the cascade of four BAUs is performed as described above, and the resulting four-stage processed signal is coupled from data paths 42 and 44 to memories 50 and 52, and is stored and retrieved in a manner which may result in a shuffling ("reshuffling") of data words. The reshuffling may be accomplished by controllably "scrambling" the write addresses and reading sequentially, or by writing sequentially and reading scrambled addresses. For definiteness, only one scrambling scheme is described, but other equivalent methods may be used.

For processing by more than four stages but less than nine stages (i.e. for five, six, seven or eight stages), the data is written from data buses 6 and 8 into memories 46 and 48 in normal sequence as described above, and is read by a bit-reversed sequence. The "bit-reversed" data is applied to BAU 10 as described above. After four stages of processing, data is written from BAU 16 into memories 50 and 52, in another scrambled or "reshuffled" sequence, which is described below and which is different from the above-described bit-reverse sequence. The data which is written into memories 50 and 52 with "reshuffled" addresses is read with normal sequence read addresses. The reshuffled information read from memories 50 and 52 is directed by multiplexer 45 to data paths 62 and 64 for coupling to the input ports of BAU 10 to begin a second pass through the cascade of BAUs of FIG. 1. The second pass may result in a total of five stages of FFT processing (32-point FFT) if the second pass through the cascade includes processing only by BAU 10 and flushing past BAUs 12, 14 and 16. Additional processing by BAUs 12, 14 and 16 results in six, seven or eight-stage processing (64-, 128- or 256-point FFT). Since memories 50 and 52 may still be actively reading data to BAU 10 at the time at which processed data appears at data paths 42 and 44, the completed data is applied to memories 46 and 48. The data is written into memories 46 and 48 in scrambled sequence.

Figure 11A:
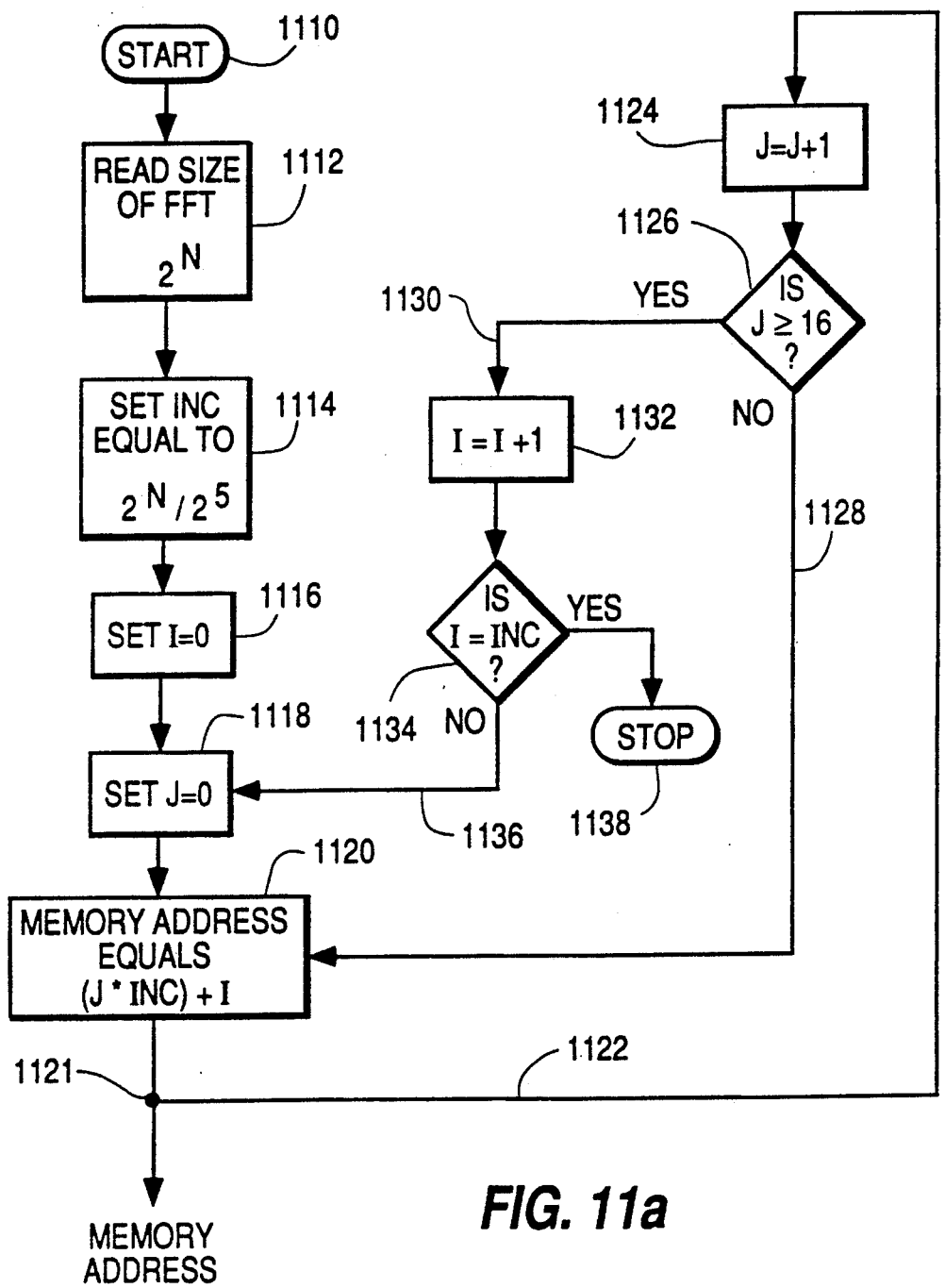
FIG. 11a is a simplified flow chart illustrating logic flow for producing reshuffled write address pointers for certain memories illustrated in FIG. 1 for reshuffling data after the first pass through the cascade of FIG. 1 and FIGS. 11b, 11c, and 11d list the order of the addresses for 64-point, 128-point and 256-point FFTs, respectively.

FIG. 11a illustrates a flow chart applicable for generating memory write addresses for 32-point and more FFT (5 and more stages) processing. This flow chart, when applied to a 32-point FFT (N=5) happens to produce a normal sequence. The sequence of memory addresses generated by the flow chart of FIG. 11a is used to write data into memories 50 and 52 after the first pass of data through the cascade of BAUs of FIG. 1.

The complete processing sequences for five-stage processing (32-point FFT), then, is (a) load memories 46 and 48 in normal sequence from the source of signal; (b) read memories 46 and 48 with bit-reversed 4-bit addresses; (c) apply the data read from memories 46 and 48 to BAU 10, and process the data through BAUs 10, 12, 14 and 16; (d) write the processed data from BAU 16 into memories 50 and 52 in normal sequence; (e) read data from memories 50 and 52 in normal sequence; (f) apply the data read from memories 50 and 52 to the input of BAU 10 for processing; (g) flush the processed output of BAU 10 past BAUs 12, 14 and 16; and (h) write the processed, flushed data into memories 46 and 48 in normal sequence, whereupon the 32-point FFT is available in memories 46 and 48, where it may be accessed by a utilization apparatus.

FIG. 11a is a flow chart illustrating a method for generation of scrambled intermediate addresses. The addresses are termed "intermediate" because they are used at a stage of processing after the first use of scrambled addressing (the bit-reversed addresses used at the initiation of processing) and before the last possible use of scrambled addressing, described below. The logic of FIG. 11a is initiated at a START block 1110, and flows to a block 1112, representing the reading of the desired FFT size. FIG. 11a applies to FFT sizes equal to or greater than 5 stages (32-point). The size is expressed as $2^N$, where N represents the number of stages of processing. The logic flows to block 1114, which represents the setting of a variable INCrement to equal $2^N/2^5$. The exponent 5 relates to the position of BAU 10 as the 5th stage of processing on a second pass through the cascade of BAUs. Block 1116 represents the setting of a running variable I to zero, and block 1118 sets a second running variable, J, to a value of zero. The logic flows to a memory address generator, represented as a block 1120, which establishes the current address by adding the current value of running variable I to the product of running variable J and INCrement (J * INC)+I. The address is made available at an output node 1121, and the logic flow loops back by way of a path 1122 to a further block 1124, at which the current value of running variable J is incremented by 1. The new value of running variable J is compared with a limit value of J in decision block 1126. The limit value of 16 is derived from the expression ($2^4$=16), where the exponent 4 relates to the number of BAUs. If J has not reached the limit value of 16, the logic leaves decision block 1126 by the NO path, and flows by path 1128 back to block 1120, which again generates an address equal to (J*INC)+I. It will be clear that a loop is formed by which block 1120 produces addresses having an initial value of I, incrementing by INC to an upper value set by decision block 1126. When the upper limit is reached in decision block 1126, the logic leaves block 1126 by the YES output and path 1130, and reaches a block 1132, representing the incrementing of running variable I. Decision block 1134 compares the current value of I to INC. So long as I is less than INC, the logic flow leaves decision block 1134 by the NO exit, and proceeds by path 1136 back to block 1118. In block 1118, J is again set to zero. These logic connections set up nested loops by which sequences of addresses are generated, which start with I and increment by INC, with each sequence starting with a new value of I (see FIGS. 11b and 11c). When the full sequence has been generated, decision block 1134 routes the logic flow to a STOP block 1138.

As mentioned, when the logic of FIG. 11a is used to generate addresses for 5-stage processing (32-point FFT), the addresses which are produced at node 1121 happen to be in normal sequence. This results because $2^N/2^5$ in block 1114 has a value of unity, and the increment is therefore by ones. In the first pass through the logic, block 1120 starts with an initial value I of zero, and multiples INC by zero. Decision block 1126 is satisfied when J=16.

Figure 11B:
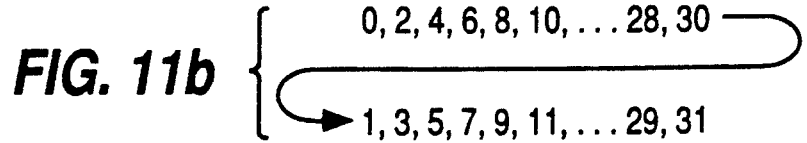

For a 64-point FFT (six-stage processing), data is initially loaded in normal sequence into memories 46 and 48, and read in a bit-reversed sequence as described above. The data read from memories 46 and 48 is coupled through multiplexer 45 and data paths 62 and 64 to BAU 10 to begin a first pass through the cascade. At the completion of the first pass, the data produced on data paths 42 and 44 is written into memories 50 and 52 in scrambled order, generated as described above by the flow chart of FIG. 11a. For a 64-point FFT, N=6, so INC is set to a value of two in block 1114 of FIG. 11a. The sequence of memory addresses is illustrated in FIG. 11b. Following the writing into memories 50 and 52 in scrambled sequence, the intermediate data is read from memories 50 and 52 in normal sequence for application through multiplexer 45 and data paths 62 and 64 of FIG. 1 back to the inputs of BAU 10. The data is processed a second time by BAU 10 and by BAU 12, and the processed data is then flushed past BAUs 14 and 16 for application by way of data paths 42 and 44 to memories 46 and 48. The data is written into memories 46 and 48 in a "final" scrambled sequence, generated by the flow chart illustrated in FIG. 12a. FIG. 12b illustrates the final address sequence for a 64-point FFT. The scrambled final sequence is used for writing processed data from data paths 42 and 43 into memories 46, 48 after the second pass through the cascade of BAUs.

Figure 12A:
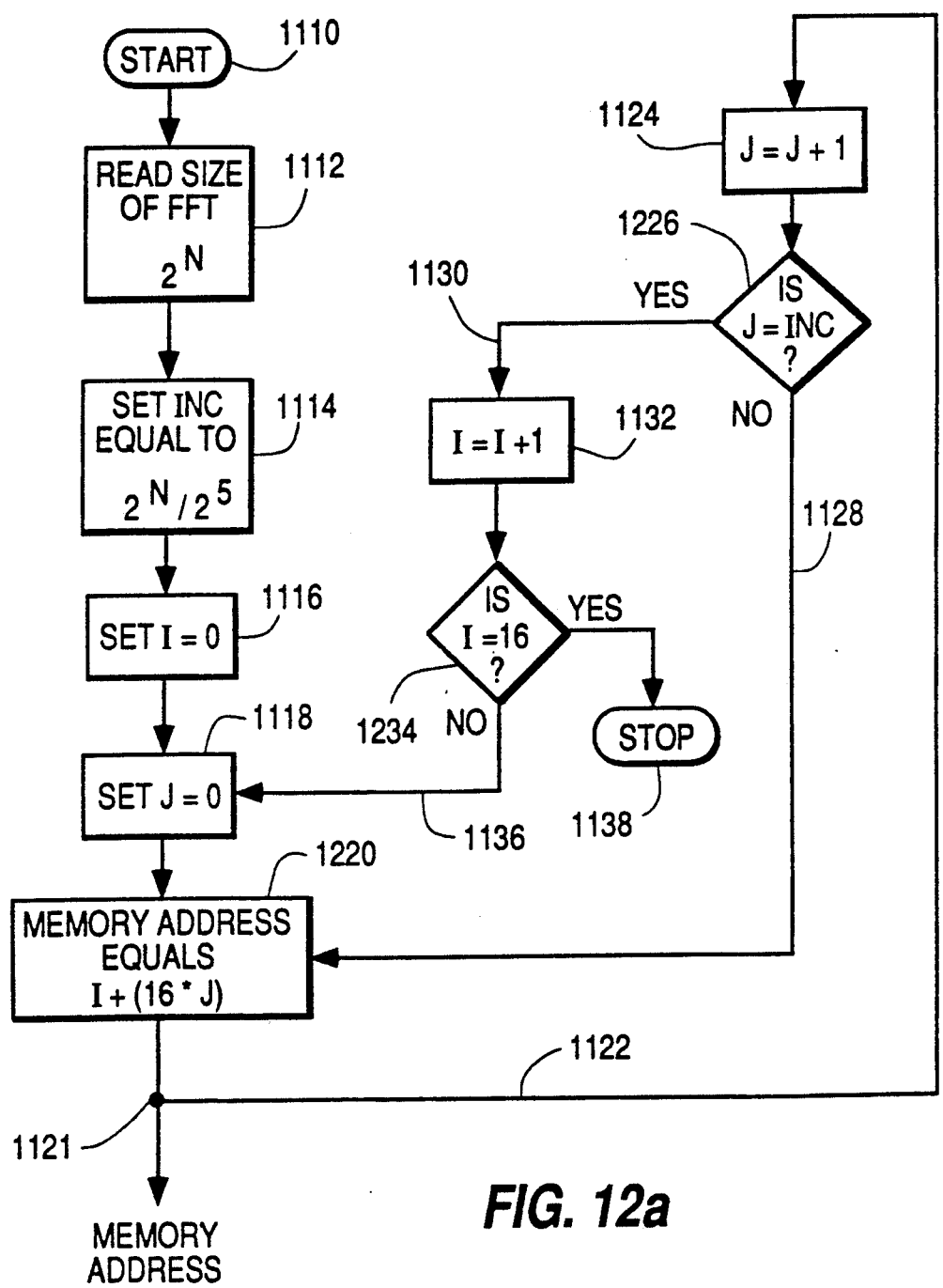
FIG. 12a is a simplified flow chart illustrating logic flow for producing reshuffled write address pointers for certain memories illustrated in FIG. 1, for reshuffling data after two passes through the cascade of FIG. 1, and FIGS. 12b, 12c, and 12d list the order of the addresses for 64-point and 128-point and 256-point FFT, respectively.
Figure 12B:
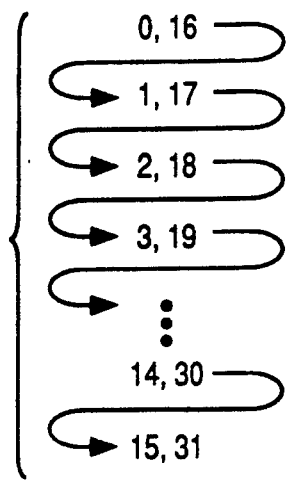
Figure 12C:
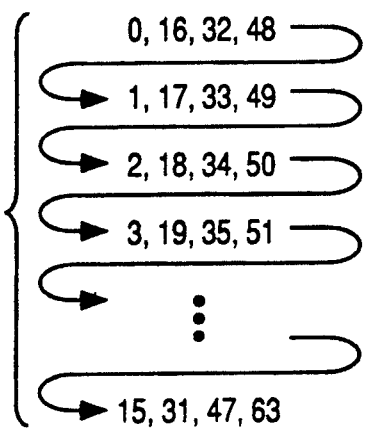

FIG. 12a is similar to, but not identical with, FIG. 11a. Elements of FIG. 12A corresponding to those of FIG. 11a are designated by the same reference numerals, and similar elements which are not identical to those of FIG. 11a are designated by the same reference numbers in the 1200 series, rather than in the 1100 series. FIG. 12 is used to generate write addresses for writing into memories 46 and 48 after the second pass through the cascade of BAUs of FIG. 1 during 5-stage to 8-stage (32 to 256 point) processing. It is also used for 9-stage processing, for writing into memories 46 and 48 after the second pass through the cascade.

In FIG. 12a, block 1220 generates memory addresses equal to I+(16×J), decision block 1226 compares running variable J with variable INC, and decision block 1234 compares the current value of I with 16. With these changes to the flow chart, the arrangement of FIG. 12a produces addresses in the order illustrated in FIGS. 12b, 12c and 12d for six-, seven-, and eight-stage processing, respectively, corresponding to 64, 128 and 256-point FFT processing, respectively. The arrangement of FIG. 12a produces a normal sequence for 5-stage processing (32-point FFT).

Figure 11C:
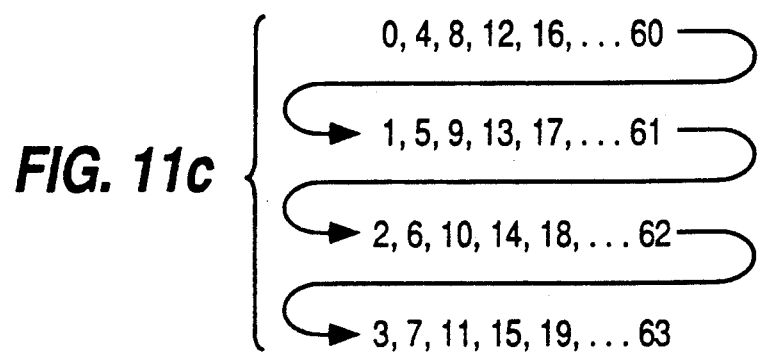

For a 128-point FFT (N=7), seven stages of BAU processing is required. Processing begins by writing data into memories 46 and 48 in normal sequence. The data is read from memories 46 and 48 in bit-reversed sequence, as described above, for application to the input ports of BAU 10 to begin a first pass through the cascade. When the first pass is completed, the processed data being produced by BAU 16 is coupled by way of data paths 42, 44 and multiplexer 45 to memories 50, 52. The data is written into memories 50, 52 in the scrambled sequence generated by the flow chart of FIG. 11a, with the value of N set to 7. With this value of N, the sequence of write addresses is illustrated in FIG. 11c. The data is written into memories 50, 52 with the scrambled sequence, and then read in normal sequence for application, by way of multiplexer 45 and data paths 60 and 62, back to the input ports of BAU 10 to begin the second pass through the cascade. The data is processed through BAUs 10, 12 and 14, and is flushed past BAU 16 to data paths 42 and 44, thereby completing the second and final pass through the cascade. The processed data is written into memories 46 and 48 in a scrambled sequence generated by the flow chart of FIG. 12, for a value of N set to 7. With this value of N, the address sequence is set forth in FIG. 12c.

Figure 11D:
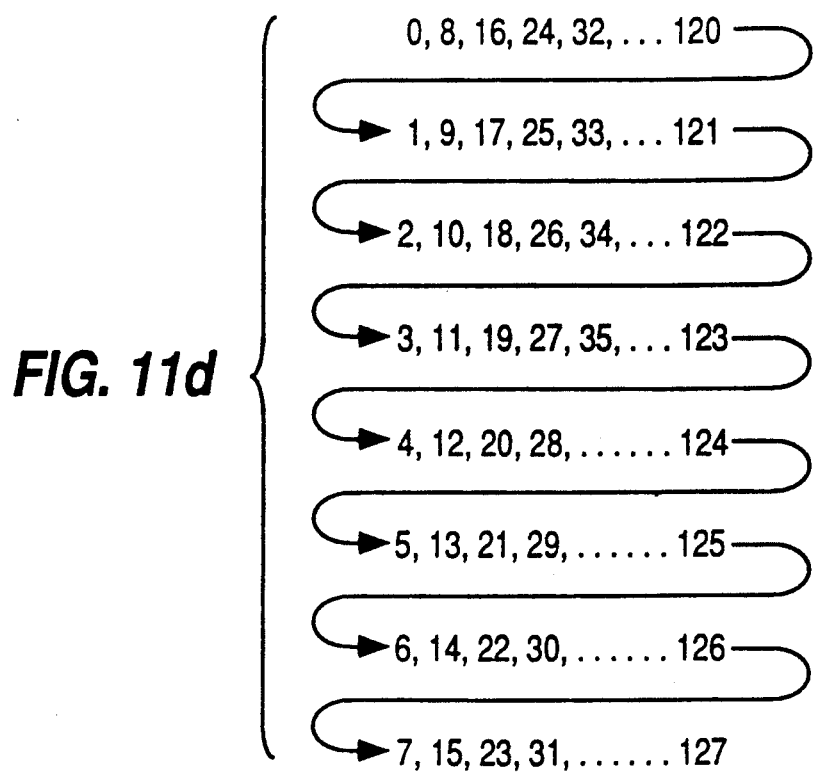
Figure 12D:
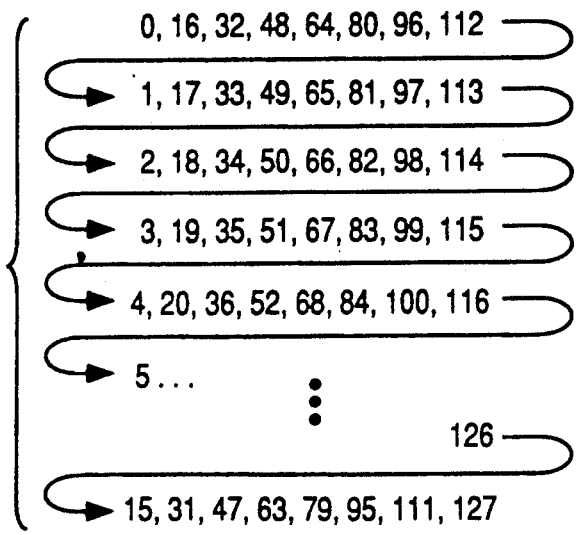

For eight stages of processing (256-point FFT), the data is initially applied from data paths 6, 8 to memories 46 and 48, and written into the memories in normal sequence. The data is read from memories 46 and 48 in bit-reversed sequence, and applied to BAU 10 to begin processing. After four stages of processing, the partially processed data is written into memories 50 and 52 in the scrambled sequence of FIG. 11d, generated by the flow chart of FIG. 11a. The data is read from memories 50 and 52 in normal sequence, and is applied to BAU 10 to begin a second pass through the cascade. At the completion of the second pass through the cascade of BAUs, the data is written into memories 46 and 48 in a second scrambled sequence generated by the flow chart of FIG. 12a, which sequence is illustrated in FIG. 12d. The data then becomes available to the utilization apparatus.

For more than eight stages of processing (i.e., for nine through 12 stages of processing), two complete passes through the cascade of BAUs, plus a third partial or complete pass, are required. The initial reading of data from memories 46 and 48 in all cases is by bit-reversed sequence, described above.

Figure 13A:
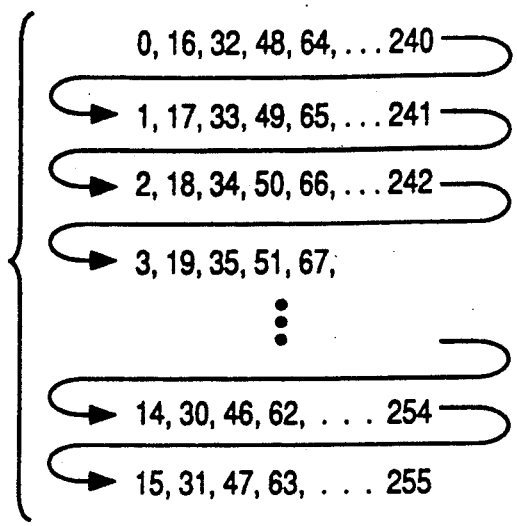
FIG. 13a, b and c are the reshuffling address sequences for memories of FIG. 1 after first, second and final passes through the cascade of FIG. 1 for 512-point FFT, corresponding to 9 stages of processing.
Figure 13B:
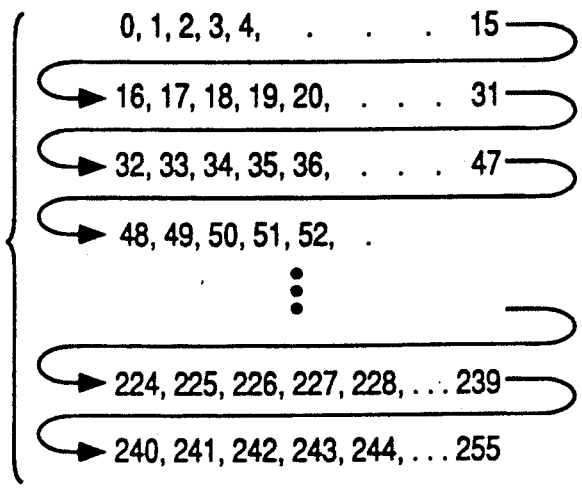
Figure 13C:
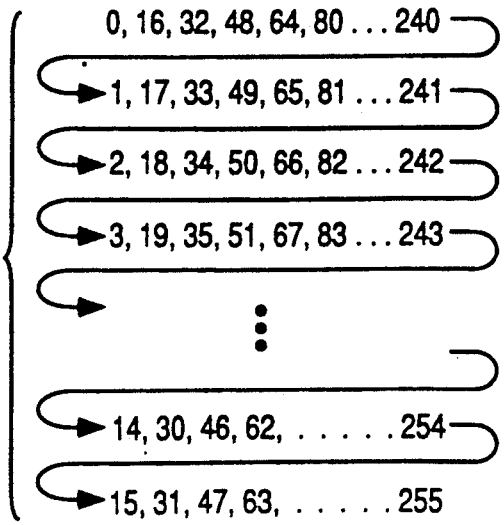

For nine stages of processing, FIGS. 13a, 13b and 13c illustrate the first intermediate, second intermediate, and final data reshuffling addresses. The first intermediate addresses of FIG. 13a are used to write data into memories 50 and 52 following the first pass through the cascade, the second intermediate addresses of FIG. 13b are used to write data into memories 46 and 48 following the second complete pass, and the final addresses of FIG. 13c are for writing data into memories 50 and 52 when processing is complete.

Figure 14A:
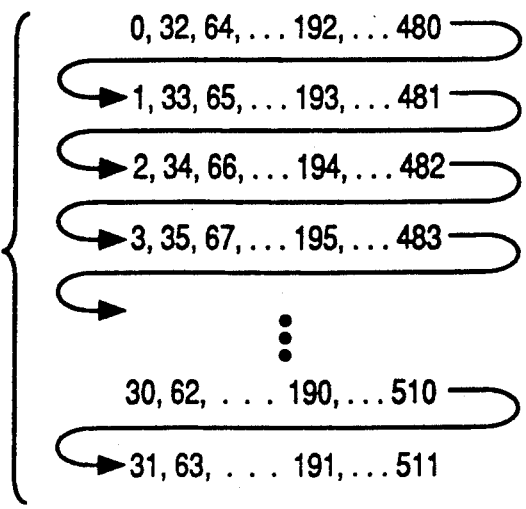
FIGS. 14a, b and c are the reshuffling address sequences for memories of FIG. 1 after first, second and final passes through the cascade of FIG. 1 for 10-stage processing (1024 point FFT).
Figure 14B:
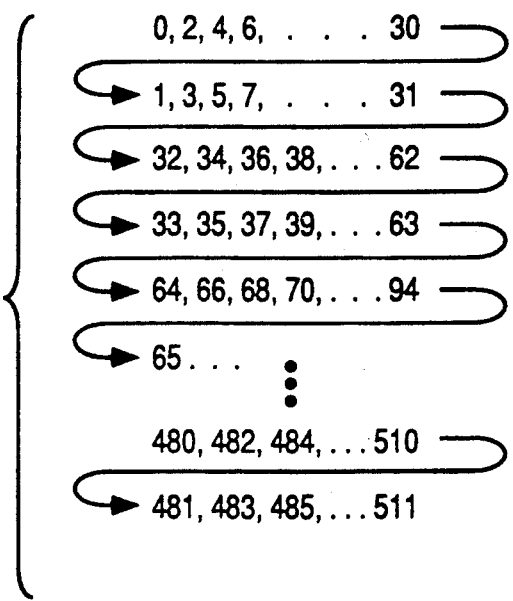
Figure 14C:
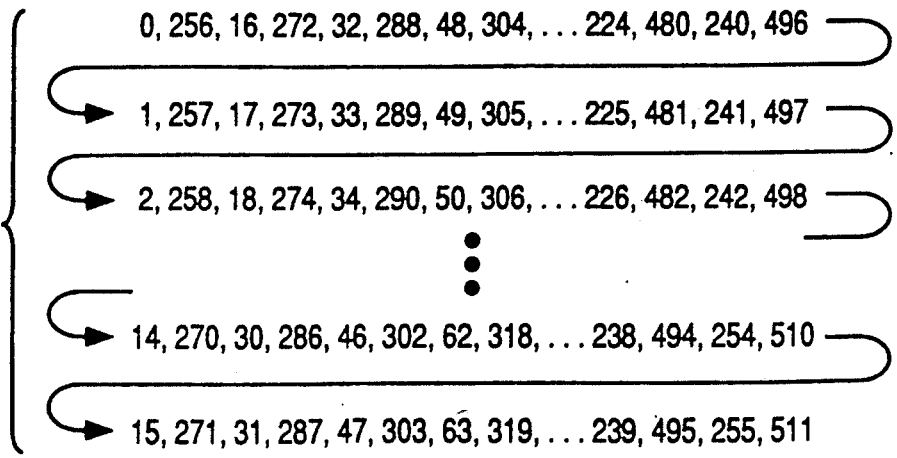

The first and second intermediate, and final reshuffling addresses for ten stages of processing (1024-point FFT) are illustrated in FIGS. 14a, b, and c, respectively. For any number of stages of processing, the memory addresses following the first pass through the cascade are generated as described in conjunction with FIG. 11a.

Other embodiments of the invention will be apparent to those skilled in the art. For example, while the arrangement of FIG. 12 is good up to nine stages, it may be expanded every four additional stages, by adding an additional DO loop to the flowchart.

What is claimed is:

1. A butterfly arithmetic unit for use in a cascade of similar arithmetic units in a pipeline Fast Fourier Transform processing, said unit accepting a stream of complex first and second information signals and complex weighting signals, said first and second information signals representing successive samples of a time-varying quantity, said arithmetic unit comprising:

complex multiplying means coupled for receiving said first and weighting signals for multiplying at least a component of said first information signals by said weighting signals for generating real and imaginary portions of a multiplied signal;

first summing means coupled to said complex multiplying means for generating as a summed output signal one of the sum and the difference of said real and imaginary portions of said multiplied signal;

controllable second summing means including a first input port coupled to said first summing means for receiving said summed output signal therefrom, a second input port coupled for receiving at least a component of said second information signals, and also including a control input port, for controllably summing, by one of addition and subtraction, one of said real and imaginary portions of said second information signal with said summed output signal from said first summing means to form a first controllably summed signal;

controllable third summing means including a first input port coupled to said first summing means for receiving said summed output signal therefrom, a second input port coupled for receiving at least a component of said second information signals, and also including a control input port, for controllably summing, by one of addition and subtraction, one of said real and imaginary portions of said second information signal with said summed output signal from said first summing means to form a second controllably summed signal;

controllable first storage means including an input port coupled to said second summing means, and also including left and right output ports, for temporarily storing said first controllably summed signals at storage locations, said first storage means being capable of being read for thereby producing left and right components of first stored information signals at said left and right output ports, respectively, of said first storage means;

controllable second storage means including an input port coupled to said second summing means, and also including left and right output ports, for temporarily storing said second controllably summed signals at storage locations, said second storage means being capable of being read for thereby producing left and right components of second stored information signals at said left and right output ports, respectively, of said second storage means;

controllable first multiplexing means including a first input port coupled to said left output port of said first storage means and a second input port coupled to said left output port of said second storage mans, and also including an output port, for coupling to said output port of said first multiplexing means said left component of one of said first and second stored information signals;

controllable second multiplexing means including a first input port coupled to said right input port of said first storage means and a second input port coupled to said right output port of said second storage means, and also including an output port, for coupling to said output port of said second multiplexing means said right component of one of said first and second stored information signals, respectively; and control means coupled to said second and third summing means, to said first and second storage means, and to said first and second multiplexing means, for causing said controllable second and third summing means to switch their summing from addition to subtraction in a cyclical manner which depends upon a location of said arithmetic unit in said cascade, for causing said first and second storage means to write their incoming controllably summed signals cyclically into selected ones of said storage locations relatively separated by an integer number of storage locations, which integer depends upon the location of said arithmetic unit in said cascade, and which integer may be zero.

2. A butterfly arithmetic unit for use in a pipeline Fast Fourier Transform processing which includes a cascade of plural similar arithmetic units, each arithmetic unit receiving a stream of sets of first and second information words together with a corresponding stream of weighting words, each of said first and second information words and said weighting words including real and imaginary components, said butterfly unit comprising:

multiplying means for multiplying corresponding ones of weighting and first information words together to produce real and imaginary components of weighted first information words;

first summing means coupled to said multiplying means receiving said real component of said weighted first information words therefrom, and also coupled for receiving at least said real component of corresponding ones of said second information words, for summing said real components of said second information words and said weighted first information words to simultaneously form at least two real intermediate sum words;

first storage means coupled to said first summing means for temporarily storing said two real intermediate sum words, said first storage means simultaneously generating left and right components of first and second stored words;

second summing means coupled to said multiplying means for receiving said imaginary component of said weighted first information words therefrom, and also coupled to receive at least said imaginary component of corresponding ones of said second information words, for summing said imaginary components of said second information and said weighted first information words to simultaneously form at least two imaginary intermediate sum words;

second storage means coupled to said second summing means for temporarily storing said two imaginary intermediate sum words, said second storage means simultaneously generating left and right components of third and fourth stored words;

first multiplexing means coupled to said first storage means and to a first output port of said butterfly arithmetic unit for simultaneously coupling to said first output port one of first and second word combinations, said first word combination being the combination of said left component of said first stored word and said left component of said second stored work, and said second word combination being the combination of said right component of said first stored word and said right component of said second stored word;

second multiplexing means coupled to said second storage means ant to second output port of said butterfly arithmetic unit for simultaneously coupling to said second output port one of third and fourth word combinations, said third signal combination being the combination of said left component of said third stored word and said left component of said fourth stored word, and said fourth word combination being the combination of said right component of said third stored word and said right component of said fourth stored word.

3. A pipeline Fast Fourier transform processor array for processing a stream of complex first and second information signals representing successive samples of a time-varying quantity, said array comprising:

first, second, third and fourth similar butterfly arithmetic units, said units being cascaded;

a controllable source of complex weighting signals;

each butterfly arithmetic unit including complex multiplexing means including first and second input ports coupled for receiving said first and weighting signals, respectively, for multiplying said first information signals by said weighting signals for generating real and imaginary portions of a multiplied signal; first summing means coupled to said complex multiplying means for generating as a summed output signal one of the sum and the difference of said real and imaginary portions of said multiplied signal controllable second summing means including a first input port coupled to said first summing means for receiving said summed output signal therefrom, a second input port coupled for receiving at least a component of said second information signals, and also including a control input port, for controllably summing, by one of addition and subtraction, one of said real and imaginary portions of said second informationsignal with said summed output signal from said first summing means to form a first controllably summed signal; controllable third summing means including a first input port coupled to said first summing means for receiving said summed output signal therefrom, a second input port coupled for receiving at least a component of said second information signals, and also including a control input port, for controllably summing, by one of addition and subtraction, one of said real and imaginary portions of said second information signal with said summed output signal from said first summing means to form a second controllably summed signal; controllable first storage means including an input port coupled to said second summing means, and also including left and right output ports, for temporarily storing said first controllably summed signals at storage locations, said first storage means being capable of being read simultaneously at two storage locations for thereby producing first left and right stored information signals at said left and right output ports, respectively, of said first storage means; controllable second storage means including an input port coupled to said third summing means, and also including left and right output ports, for temporarily storing said second controllably summed signals at storage locations, said second storage means being capable of being read simultaneously at two storage locations for thereby producing left and right components of second stored information signals at said left and right output ports, respectively, of said second storage means; controllable first multiplexing means including a first input port coupled to said left output port of said first storage means and a second input port coupled to said left output port of said second storage means, and also including an output port, for coupling to said output port of said first multiplexing means said left component of one of said first and second stored information signals; controllable second multiplexing means including a first input port coupled to said right output port of said first storage means and as second input port coupled to said right output port of said second storage means, and also including an output port, for coupling to said output port of said second multiplexing means said right component of one of said first and second stored information signals, respectively; and control means coupled to said second third summing means, to said first and second storage means, and to said first and second multiplexing means, for causing said controllable second and third summing means to switch their summing from addition to subtraction in a cyclical manner which depends upon a location of said arithmetic unit in said cascade, for causing said first and second storage means to write their incoming controllably summed signals cyclically into selected ones of said storage locations relatively separated by an integer number of storage locations, which integer depends upon the location of said arithmetic unit in said cascade, and which integer may be zero, for causing said first and second storage means to read alternately, and for causing said first and second storage means when used to read from storage location pairs, which pairs depend upon said position of said arithmetic unit in said cascade;

said complex multiplying means of each butterfly arithmetic unit being coupled to said output port of said second multiplexing means of the preceding butterfly arithmetic unit for receiving said right component of one of said first and second stored information signals of said preceding butterfly arithmetic unit as said first information signals, and with said second input ports of said second and third summing means of each of said second, third and fourth butterfly arithmetic units coupled to said output port of said first multiplexing means of the preceding butterfly arithmetic unit for receiving said left component of one of said first and second stored information signals of said preceding butterfly arithmetic unit as said second information signals; and means coupled to said control means of said first, second, third and fourth butterfly arithmetic units for providing information relating to their location in said cascade.

4. A pipeline Fast Fourier transform processor according to claim 3, further comprising storage means coupled to said output ports of said first and second multiplexing means of said fourth butterfly arithmetic unit, to said first input por tof said complex multiplying means and to said second input port of said controllable second summing means of said first butterfly arithmetic unit, for storing signals processed by said fourth butterfly arithmetic unit, and for coupling said signals processed by said fourth butterfly arithmetic unit back to said first butterfly arithmetic unit for further processing.

5. A pipeline Fast Fourier transform processor according to claim 4, further comprising scrambled addressing means for addressing said storage means in orders which differ as between reading and writing, whereby said signals processed by said fourth butterfly, arithmetic unit are reshuffled before being coupled back to said first butterfly arithmetic unit.

* * * * *

UNITED STATES PATENT AND TRADEMARK OFFICE
CERTIFICATE OF CORRECTION

PATENT NO. : 5,038,311

DATED : August 6, 1991

INVENTOR(S) : Monastra et al.

It is certified that error appears in the above-identified patent and that said Letters Patent is hereby corrected as shown below:

Column 11, line 56, delete "35"

Column 13, line 59, after "FIG. 2," add --and the configurations of multiplexers 230 and 232. As--

Column 14, line 36, "18" should read --218--

Column 22, line 18, "processing," should read --processor,--

Column 23, line 37, "processing" should read --processor--

Column 24, line 21, "ant" should read --and--

Column 24, line 48, "signal" should read --signal;--

Column 25, line 31, "as" should read --a--

Column 26, line 33, "por tof" should read --port of--

Signed and Sealed this

Second Day of February, 1993

*Attest:*

STEPHEN G. KUNIN

*Attesting Officer*     *Acting Commissioner of Patents and Trademarks*